(12) United States Patent
Fukunaga et al.

(10) Patent No.: US 11,389,898 B2
(45) Date of Patent: Jul. 19, 2022

(54) LASER PROCESSING APPARATUS, LASER PROCESSING METHOD, AND METHOD FOR MANUFACTURING SEMICONDUCTOR APPARATUS

(71) Applicant: Mitsubishi Electric Corporation, Tokyo (JP)

(72) Inventors: Keigo Fukunaga, Tokyo (JP); Tamio Matsumura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 263 days.

(21) Appl. No.: 16/346,974

(22) PCT Filed: Dec. 13, 2017

(86) PCT No.: PCT/JP2017/044721
§ 371 (c)(1),
(2) Date: May 2, 2019

(87) PCT Pub. No.: WO2018/116932
PCT Pub. Date: Jun. 28, 2018

(65) Prior Publication Data
US 2020/0061742 A1 Feb. 27, 2020

(30) Foreign Application Priority Data
Dec. 22, 2016 (JP) .............................. JP2016-249662

(51) Int. Cl.
*B23K 26/12* (2014.01)
*B23K 26/146* (2014.01)
(Continued)

(52) U.S. Cl.
CPC ...... *B23K 26/1224* (2015.10); *B23K 26/0869* (2013.01); *B23K 26/146* (2015.10); *B23K 26/142* (2015.10)

(58) Field of Classification Search
CPC .. B23K 26/0869; B23K 26/146; B23K 26/38; B23K 26/1224; B23K 26/0622;
(Continued)

(56) References Cited

U.S. PATENT DOCUMENTS

2006/0092990 A1* 5/2006 Koga ..................... B23K 26/04
372/7
2007/0193990 A1 8/2007 Richerzhagen et al.
(Continued)

FOREIGN PATENT DOCUMENTS

DE 102007055284 A1 5/2008
DE 102010054036 A1 6/2011
(Continued)

OTHER PUBLICATIONS

Office Action dated Apr. 22, 2020, issued in corresponding Japanese Patent Application No. 2018-557708, 14 pages including 7 pages of English translation.
(Continued)

*Primary Examiner* — Joel M Attey
*Assistant Examiner* — Rachel R Rizzo
(74) *Attorney, Agent, or Firm* — Buchanan Ingersoll & Rooney PC

(57) ABSTRACT

A laser processing apparatus includes a holder configured to hold a workpiece, a head, a first nozzle, and a driver. The head is configured to irradiate a first portion of a main surface of the workpiece with a laser beam. The first nozzle is configured to supply a first liquid to the first portion. The driver is configured to drive the holder in such a manner that the workpiece can revolve around the optical axis of the laser beam at the first portion. Accordingly, the workpiece can be processed, and debris of the workpiece can be prevented from adhering to the main surface of the workpiece.

14 Claims, 30 Drawing Sheets

(51) Int. Cl.
  *B23K 26/08* (2014.01)
  *B23K 26/142* (2014.01)
(58) Field of Classification Search
  CPC .... B23K 37/04; B23K 37/0408; B23K 26/08;
    B23K 26/082; B23K 26/127; B23K
    26/1462; B23K 26/36; B23K 26/0624;
    B23K 26/1464; B23K 26/083; B23K
    26/046; B23K 26/064; B23K 26/352;
    B23K 26/067; B23K 26/0006; B23K
    26/359; B23K 26/0876; B23K 26/009;
    B23K 26/60; B23K 26/702; B23K
    26/0823; B23K 26/032; B23K 26/06;
    B23K 26/0652; B23K 26/34; B23K
    26/14; B23K 26/382; B23K 26/26; B23K
    26/147; B23K 26/123; B23K 26/16;
    B23K 26/1476; B23K 26/53; B23K
    26/0648; B23K 26/0821; B23K 26/122;
    B23K 26/364; B23K 26/0665; B23K
    26/0853; B23K 26/04; B23K 26/402;
    B23K 26/00; B23K 26/40; B23K 26/142;
    H01L 21/304; H01L 22/20; H01L
    21/30604; H01L 29/0657; H01L
    21/28512; H01L 23/4827; H01L 24/27;
    H01L 21/67115; H01L 21/6838; H01L
    21/02076; H01L 21/0337; H01L
    21/67075; H01L 21/0275; H01L 21/6704;
    H01L 21/67132; H01L 21/6833; H01L
    21/6836; H01L 21/6835; H01L 21/82;
    H01L 21/68785; H01L 21/68764; H01L
    21/6719; H01L 21/68728; H01L 21/6715;
    H01L 21/67051; H01L 21/308; H01L
    21/3043; H01L 21/02057; H01L 23/562;
    H01L 21/02667; H01L 29/7397; H01L
    27/0664; H01L 29/1604; H01L 29/0692;
    H01L 29/868; H01L 29/0649; H01L
    21/324; H01L 29/6609; H01L 27/0629;
    H01L 29/66136; H01L 29/861; H01L
    29/16; H01L 21/02532; H01L 24/32;
    H01L 24/83; H01L 21/268; H01L 24/95;
    H01L 21/302; H01L 29/30; H01L 24/06;
    H01L 24/05; H01L 22/12; H01L
    21/67092; H01L 21/78; B24B 49/12;
    B24B 27/0023; B24B 41/068; B24B
    37/042; B24B 1/00; B24B 7/228; H01S
    3/10; H01S 5/2018; H01S 5/0265; H01S
    5/2081; H01S 5/026; H01S 5/2275; H01S
    5/0202; H01S 5/0286; H01S 5/2226;
    H01S 5/06226; H01S 5/309; G02B 6/136;
    G02B 6/12004; H01J 37/321; H01J
    37/32174
  See application file for complete search history.

(56) References Cited

U.S. PATENT DOCUMENTS

2008/0115891 A1  5/2008  Yoshida et al.
2016/0155656 A1* 6/2016  Matsumura ......... H01L 21/6838
                                              438/464

FOREIGN PATENT DOCUMENTS

| JP | 01202387 A |   | 8/1989 |
| JP | 10328879 A |   | 12/1998 |
| JP | 2001130921 A |   | 5/2001 |
| JP | 2002263873 A | * | 9/2002 |
| JP | 2002263873 A |   | 9/2002 |
| JP | 2006122982 A |   | 5/2006 |
| JP | 2007147837 A |   | 6/2007 |
| JP | 2007222897 A | * | 9/2007 |
| JP | 2007222897 A |   | 9/2007 |
| JP | 2007537881 A |   | 12/2007 |
| JP | 2012101230 A |   | 5/2012 |
| JP | 2013158799 A |   | 8/2013 |
| JP | 2013202659 A |   | 10/2013 |
| JP | 2014113604 A |   | 6/2014 |
| JP | 2014113604 A | * | 6/2014 |
| JP | 2015115538 A |   | 6/2015 |
| JP | 2015139778 A |   | 8/2015 |

OTHER PUBLICATIONS

Chinese Office Action dated Aug. 3, 2020 issued by the Chinese Patent Office in corresponding Chinese Patent Application No. 201780076986.2, with English translation (38 pages).

International Search Report (PCT/ISA/210) dated Feb. 20, 2018, by the Japan Patent Office as the International Searching Authority for International Application No. PCT/JP2017/044721.

Office Action dated Jan. 20, 2022, issued in the corresponding German Patent Application No. 112017006493.7, 16 pages 7 pages of English Translation.

Office Action dated Apr. 30, 2021, issued in corresponding Chinese Patent Application No. 201780076986.2, 42 pages including 24 pages of English translation.

* cited by examiner

LASER PROCESSING APPARATUS, LASER PROCESSING METHOD, AND METHOD FOR MANUFACTURING SEMICONDUCTOR APPARATUS

TECHNICAL FIELD

The present invention relates to a laser processing apparatus, a laser processing method, and a method for manufacturing a semiconductor apparatus.

BACKGROUND ART

Japanese Patent Laying-Open No. 2015-115538 (PTL1) discloses a laser processing apparatus and a laser processing method for forming grooves in a semiconductor wafer by irradiating the semiconductor wafer with a laser beam guided by a liquid column.

CITATION LIST

Patent Literature

PTL 1: Japanese Patent Laying-Open No. 2015-115538

SUMMARY OF INVENTION

Technical Problem

An object of the present invention is to provide a laser processing apparatus, a laser processing method, and a method for manufacturing a semiconductor apparatus that can efficiently process a workpiece and prevent debris, which is generated from the workpiece during laser processing of the workpiece, from adhering to the main surface of the workpiece.

Solution to Problem

A laser processing apparatus of the present invention includes a holder, a head, a first nozzle, and a driver. The holder is configured to hold a workpiece. The head is configured to irradiate a first portion of a main surface of the workpiece with a laser beam. The first nozzle is configured to supply a first liquid to the first portion. The driver is configured to drive the holder in such a manner that the workpiece can revolve around an optical axis of the laser beam at the first portion.

A laser processing method of the present invention includes supplying a first liquid from a first nozzle to a first portion of a main surface of a workpiece, and irradiating the first portion with a laser beam while revolving the workpiece around an optical axis of the laser beam at the first portion.

A method for manufacturing a semiconductor apparatus of the present invention includes separating a workpiece into an inner circumferential region of the workpiece and an outer circumferential region of the workpiece using the laser processing apparatus of the present invention, and forming semiconductor devices in the inner circumferential region of the workpiece before separating the workpiece.

Advantageous Effects of Invention

In the laser processing apparatus of the present invention, the revolution of the workpiece exerts a centrifugal force on the liquid layer formed on the main surface by supplying the first liquid onto the main surface. Due to this centrifugal force, the thickness of the liquid layer is smallest at the first portion and increases with distance from the first portion. Therefore, diffusion and attenuation of the laser beam due to the liquid layer can be reduced. Also, the main surface is prevented from being exposed through the liquid layer. The liquid layer immediately cools and washes away the debris generated by processing the workpiece with the laser beam. According to the laser processing apparatus of the present invention, the workpiece can be efficiently processed, and the debris generated from the workpiece during laser processing of the workpiece can be prevented from adhering to the main surface of the workpiece.

In the laser processing method of the present invention, the revolution of the workpiece exerts a centrifugal force on the liquid layer formed on the main surface by supplying the first liquid onto the main surface. Due to this centrifugal force, the thickness of the liquid layer is smallest at the first portion and increases with distance from the first portion. Therefore, diffusion and attenuation of the laser beam due to the liquid layer can be reduced. Also, the main surface is prevented from being exposed through the liquid layer. The liquid layer immediately cools and washes away the debris generated by processing the workpiece with the laser beam. According to the laser processing method of the present invention, the workpiece can be efficiently processed, and the debris generated from the workpiece during laser processing of the workpiece can be prevented from adhering to the main surface of the workpiece.

According to the method for manufacturing a semiconductor apparatus of the present invention, the workpiece can be efficiently processed, and the debris generated from the workpiece during laser processing of the workpiece can be prevented from adhering to the main surface of the workpiece.

DESCRIPTION OF EMBODIMENTS

Figure 1:
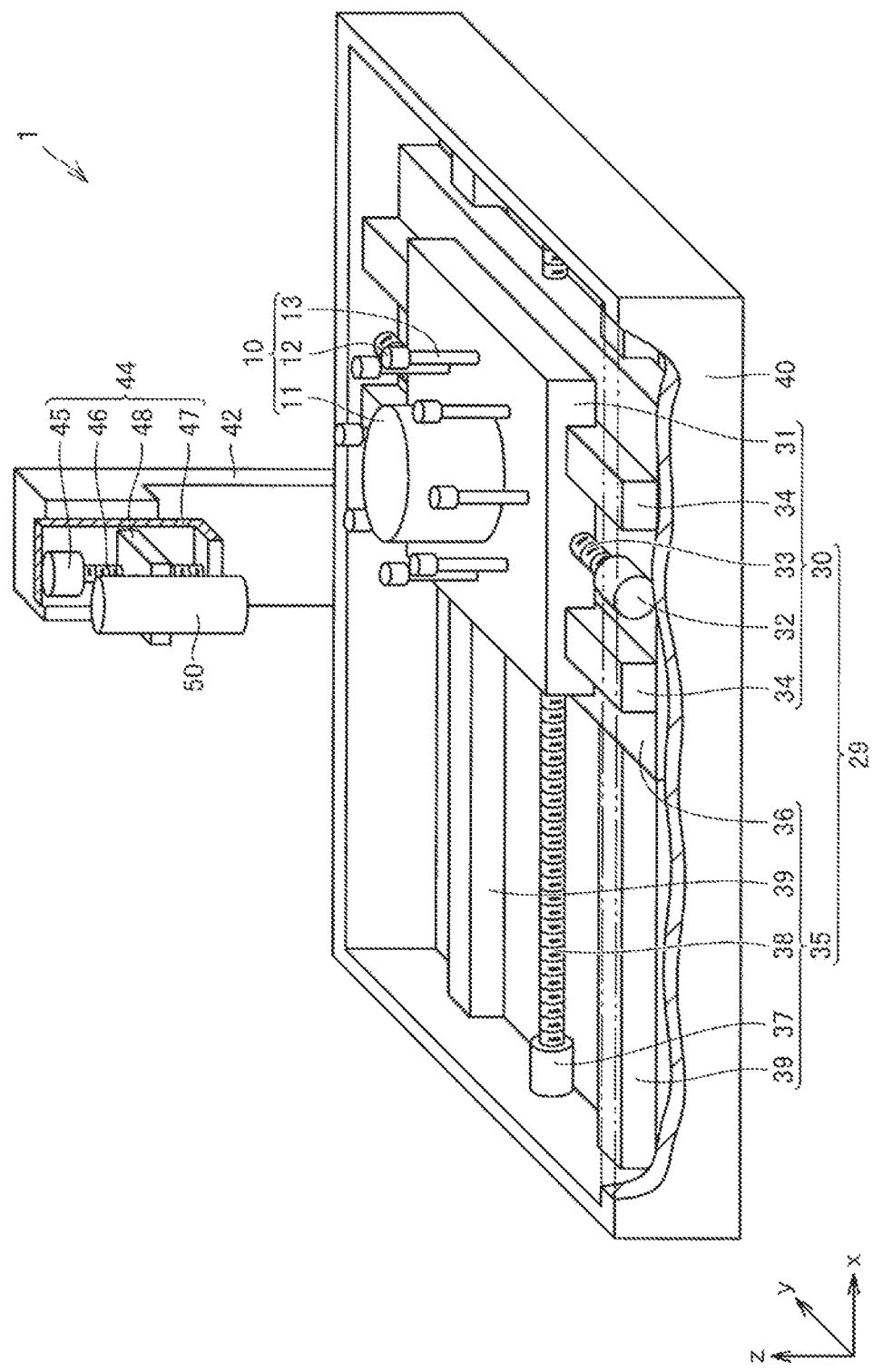
FIG. 1 is a schematic perspective view of a laser processing apparatus in embodiment 1 of the present invention.

Embodiments of the present invention are described hereinafter. Identical components are identically denoted, and the explanation thereof is not repeated.

Embodiment 1

With reference to FIG. 1 to FIG. 11, a laser processing apparatus 1 in embodiment 1 is described. Laser processing apparatus 1 mainly includes a holder 10, a head 50, a first nozzle 54, and a driver 29. Laser processing apparatus 1 may further include a controller 80.

Figure 10:
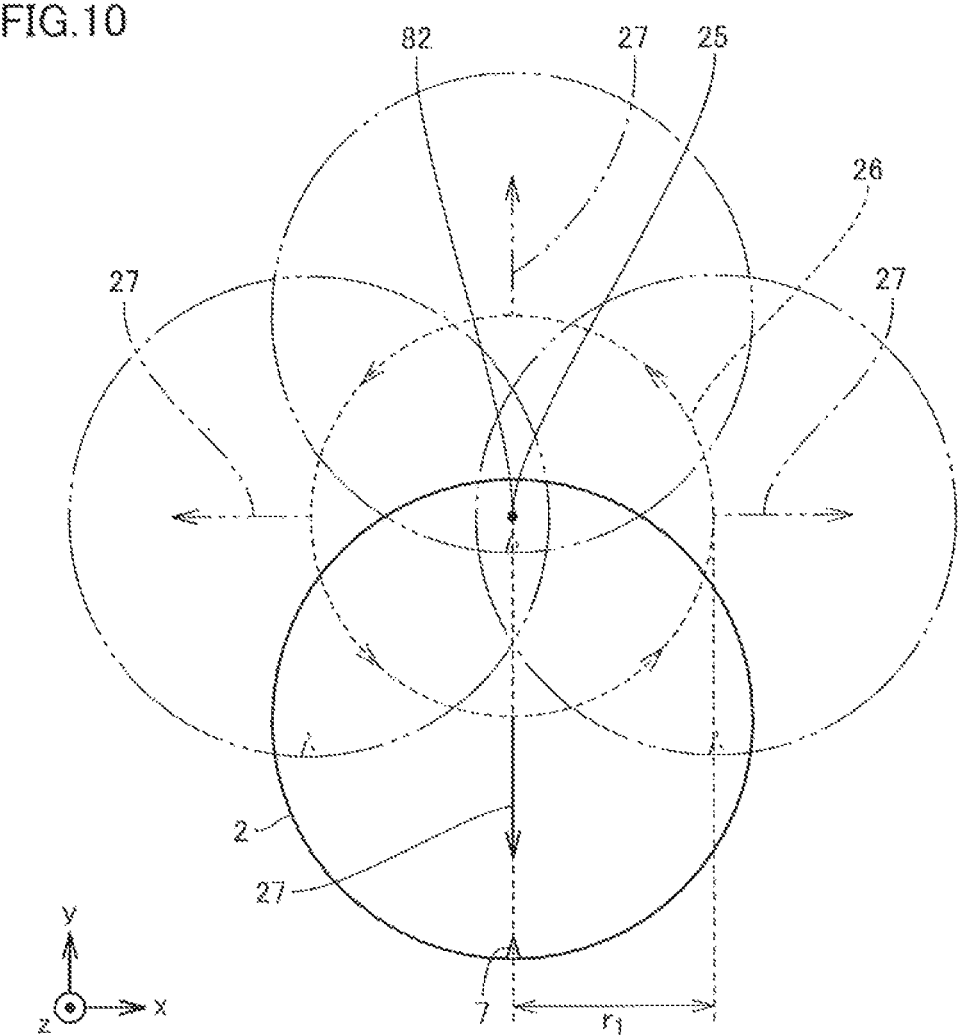
FIG. 10 is a plan view showing revolution of a workpiece in a laser processing apparatus in embodiment 1 of the present invention.
Figure 11:
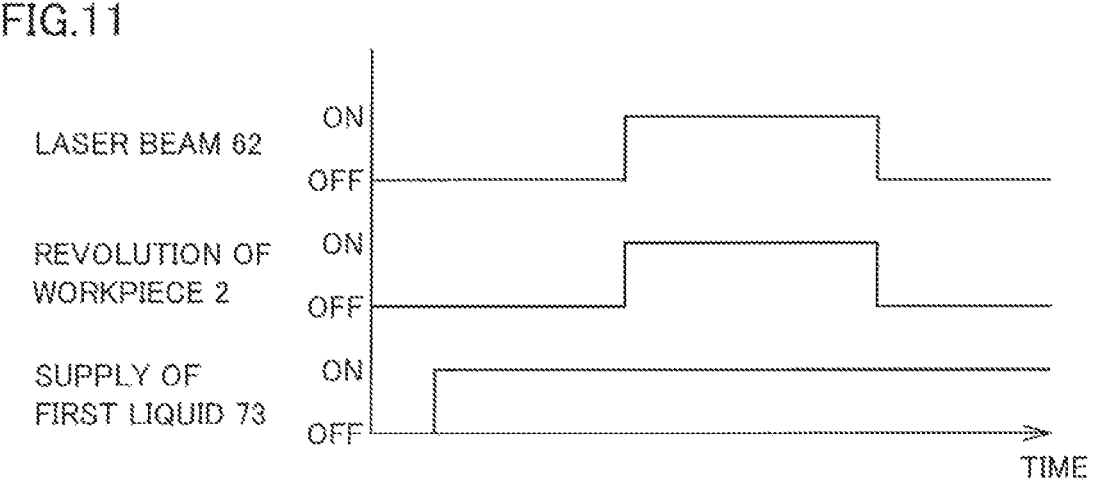
FIG. 11 shows a timing chart of a laser processing method in embodiment 1 of the present invention.

Holder 10 is configured to hold a workpiece 2. An example of workpiece 2 is described with reference to FIG. 3. Workpiece 2 may be a semiconductor wafer, such as a silicon wafer or a silicon carbide wafer. Workpiece 2 has a first main surface 3 and a second main surface 4 opposite to first main surface 3. A semiconductor device, such as an insulated-gate bipolar transistor (IGBT) or a metal-oxide-semiconductor field-effect transistor (MOSFET), may be formed on first main surface 3 of workpiece 2. Workpiece 2 may include an inner circumferential region 5 and an outer circumferential region 6. Inner circumferential region 5 may be thinner than outer circumferential region 6. With reference to FIG. 10, the workpiece may have a notch 7 formed in first main surface 3. Notch 7 may serve as an indication of the orientation of the workpiece.

As shown in FIG. 1, holder 10 may include a first holding sub-portion 11, a plurality of second holding sub-portions 12, and a plurality of first arms 13. First holding sub-portion 11 may hold workpiece 2 with a larger area than second holding sub-portions 12. First holding sub-portion 11 may be configured to hold inner circumferential region 5 of workpiece 2. Second holding sub-portions 12 may be disposed around first holding sub-portion 11. Second holding sub-portions 12 may be configured to hold outer circumferential region 6 of workpiece 2 at a plurality of spots. A plurality of first arms 13 are connected to a first base 31 and second holding sub-portions 12. A plurality of first arms 13 are each configured to change its length. A plurality of first arms 13 can change the height of second holding sub-portions 12 in accordance with the shape of workpiece 2.

Figure 4:
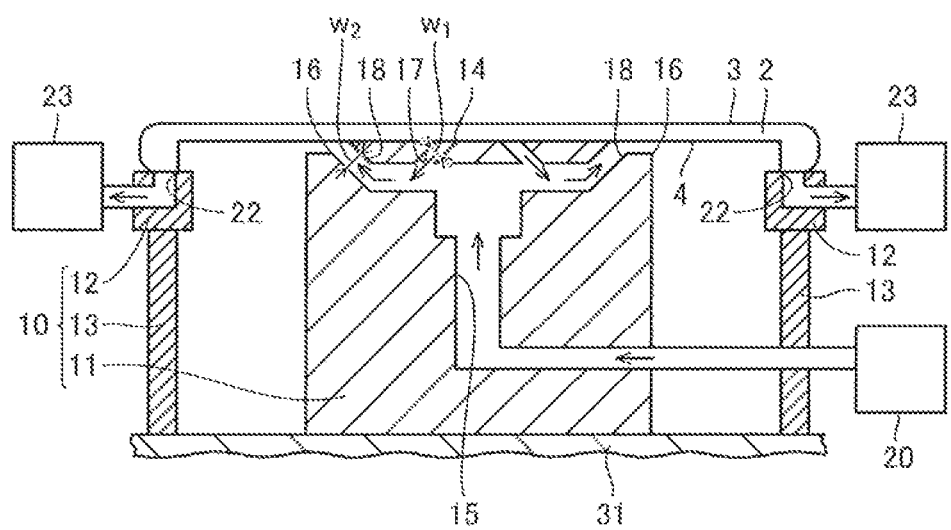
FIG. 4 is a schematic partial enlarged cross-sectional view of a holder included in a laser processing apparatus in embodiment 1 of the present invention.

With reference to FIG. 4, first holding sub-portion 11 has a first suction hole 14. First holding sub-portion 11 may further have a cavity 15 and an exhaust hole 16. First suction hole 14 communicates with cavity 15 via a first flow path 17. Exhaust hole 16 communicates with cavity 15 via a second flow path 18. First flow path 17 is smaller than second flow path 18 in cross-sectional area. For example, width $w_1$ of first flow path 17 may be narrower than width $w_2$ of second flow path 18. Cavity 15 communicates with a pressurized gas supply portion 20. When pressurized gas is supplied from pressurized gas supply portion 20 to cavity 15, the pressurized gas is discharged to the outside of first holding sub-portion 11 from exhaust hole 16 through cavity 15 and second flow path 18. Since first flow path 17 is smaller than second flow path 18 in cross-sectional area, a negative pressure is generated in first flow path 17 by the Venturi effect. Due to this negative pressure, inner circumferential region 5 of workpiece 2 sticks to first holding sub-portion 11. Thus, inner circumferential region 5 of workpiece 2 is held on first holding sub-portion 11.

Second holding sub-portions 12 have second suction holes 22. Second suction holes 22 communicate with vacuum pumps 23. By actuating vacuum pumps 23, outer circumferential region 6 of workpiece 2 sticks to second holding sub-portions 12. Thus, outer circumferential region 6 of workpiece 2 is held on second holding sub-portions 12.

With reference to FIG. 5 to FIG. 8, head 50 is configured to irradiate a first portion 82 of first main surface 3 of workpiece 2 with a laser beam 62. First portion 82 is a portion of workpiece 2 to be laser-processed, such as a boundary portion between inner circumferential region 5 and outer circumferential region 6. Head 50 may include a mirror 51, a lens 52, and a transparent window 53. Mirror 51 reflects laser beam 62 toward workpiece 2. Lens 52 may condense laser beam 62. Transparent window 53 transmits laser beam 62 and partitions the space in head 50.

Figure 7:
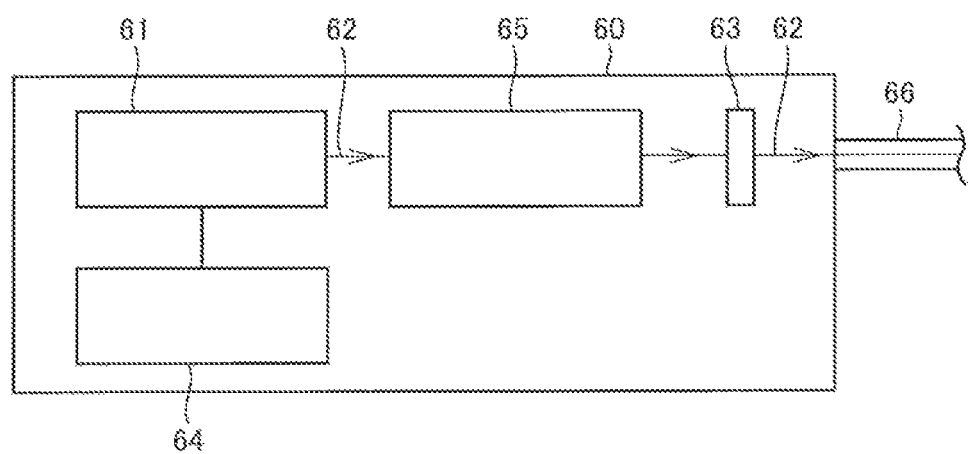
FIG. 7 is a schematic partial enlarged view of a laser source unit included in a laser processing apparatus in embodiment 1 of the present invention.
Figure 8:
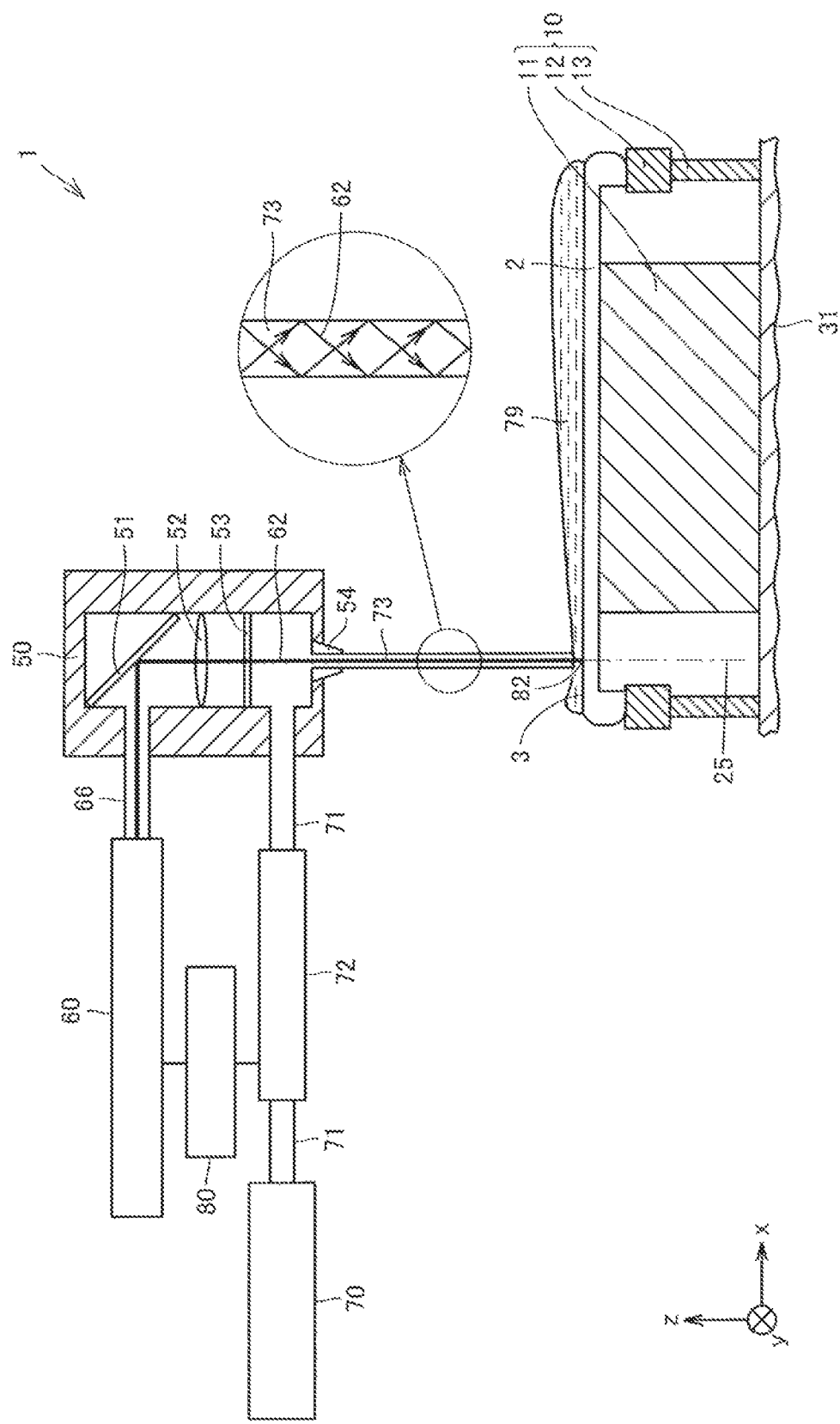
FIG. 8 is a schematic partial enlarged cross-sectional view of a laser processing apparatus in embodiment 1 of the present invention.
Figure 9:
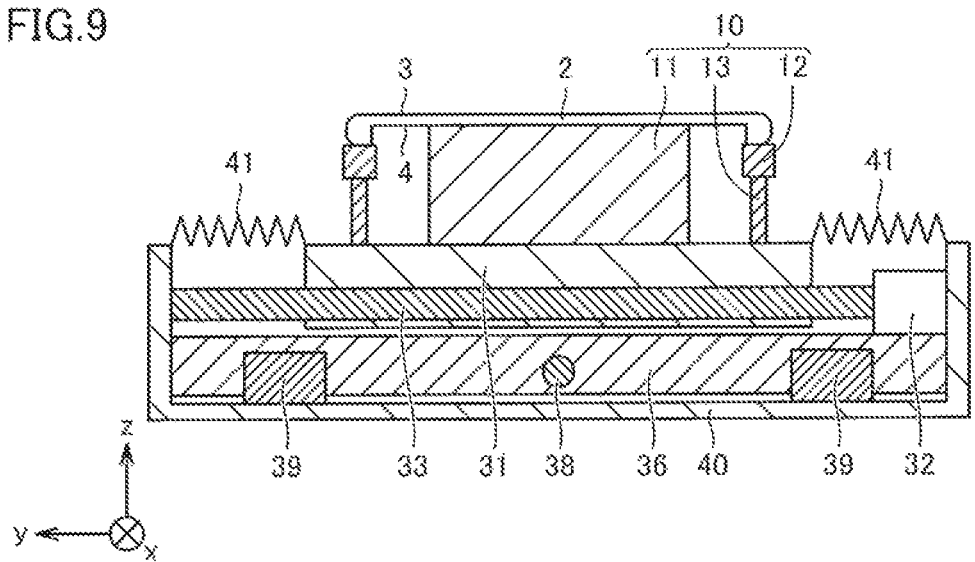
FIG. 9 is a schematic cross-sectional view, taken along cross-sectional line IX-IX shown in FIG. 2, of a laser processing apparatus in embodiment 1 of the present invention.

A laser source unit 60 is connected to head 50. In particular, laser source unit 60 may be connected to head 50 via a light guide 66, such as an optical fiber. With reference to FIG. 7, laser source unit 60 includes a laser source 61. Laser source 61 outputs laser beam 62. Laser source 61 may be, but is not limited to, an Nd:YAG laser, an Nd:YLF laser, an Nd:YVO$_4$ laser, or a Ti-sapphire laser. If workpiece 2 is a silicon carbide, laser beam 62 preferably has a wavelength of shorter than 532 nm. As shown in FIG. 8, laser beam 62 emitted from laser source 61 is reflected by mirror 51, condensed by lens 52, transmitted through transparent window 53, and emitted to first portion 82 of first main surface 3 of workpiece 2.

As shown in FIG. 7, laser source unit 60 may further include a shutter 63, a frequency regulator 64, and a power meter 65. Shutter 63 is configured to operate switchably between a first state in which laser beam 62 is transmitted, and a second state in which laser beam 62 is blocked. Frequency regulator 64 regulates the oscillatory frequency of laser source 61. Power meter 65 measures the power of laser beam 62 emitted from laser source 61. Based on the measured power of laser beam 62, the power of laser beam 62 emitted from laser source 61 can be adjusted.

Figure 2:
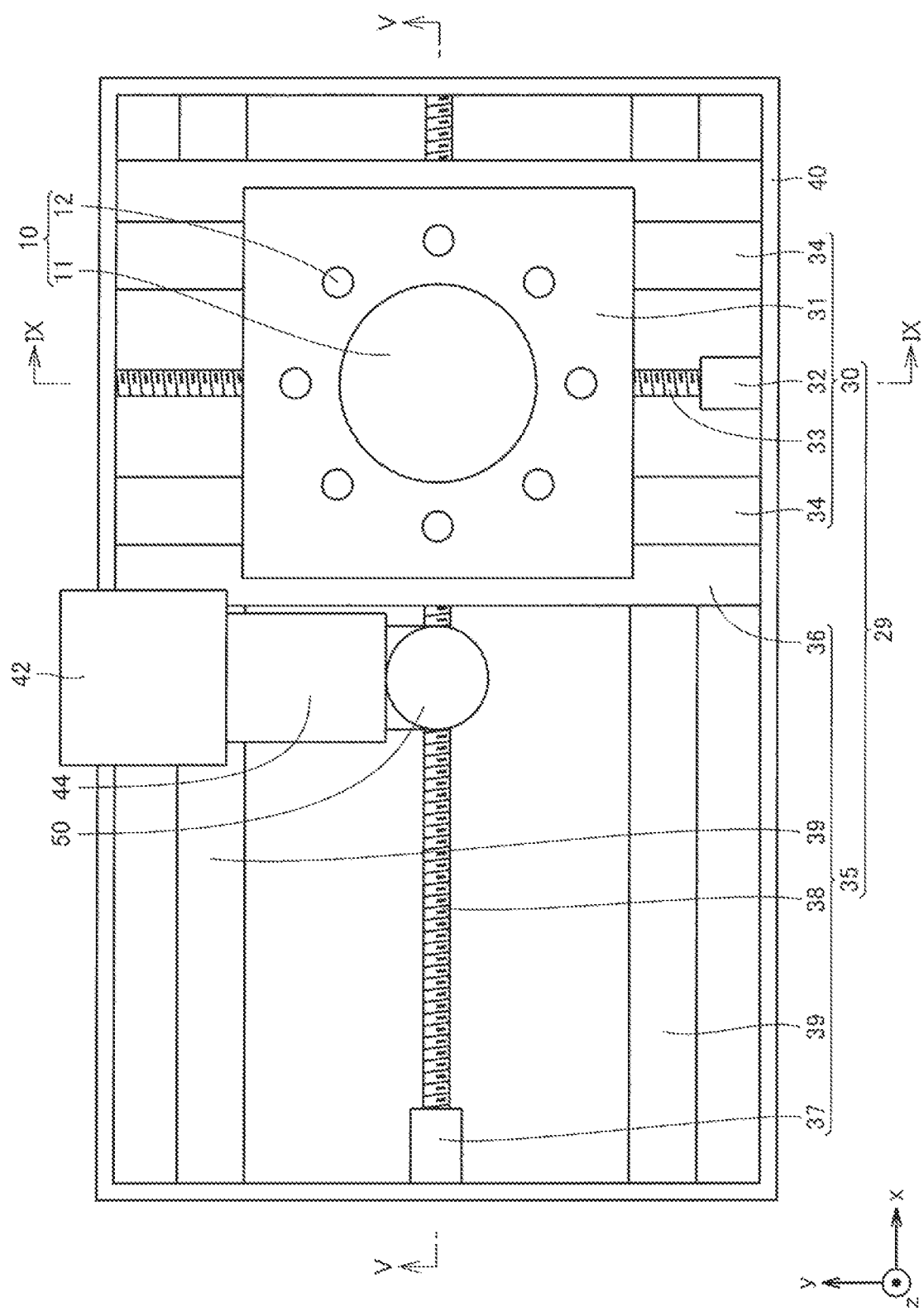
FIG. 2 is a schematic plan view of a laser processing apparatus in embodiment 1 of the present invention.

With reference to FIG. 1 and FIG. 2, head 50 is attached to a third base 40. In particular, head 50 may be attached to third base 40 movably in the height direction (z direction). Specifically, head 50 may be attached to third base 40 via a support 42 and a third driver 44. Third driver 44 may include a third motor 45, a third ball screw 46, a fourth base 47, and a fifth base 48 to which head 50 is fixed.

Support 42 may have one end attached to third base 40, and the other end attached to fourth base 47. Third motor 45 may be attached to fourth base 47. Third driver 44 is configured to move head 50 in the height direction (z direction). Specifically, third ball screw 46 is screwed into fifth base 48. Third ball screw 46 extends in the height direction (z direction). Third motor 45 rotates third ball screw 46. Thus, head 50 can move in the height direction (z direction) in which third ball screw 46 extends.

First nozzle 54 is configured to supply a first liquid 73 to first portion 82 of first main surface 3 of workpiece 2. In particular, first nozzle 54 may be configured to supply first liquid 73 and emit laser beam 62 to first portion 82. First nozzle 54 may be provided on head 50 in such a manner that laser beam 62 can be emitted from first nozzle 54 and can propagate through a liquid column (73) formed by first liquid 73 between first nozzle 54 and first portion 82. Laser beam 62 may propagate through liquid column (73) while being totally reflected by the surface of liquid column (73).

Figure 6:
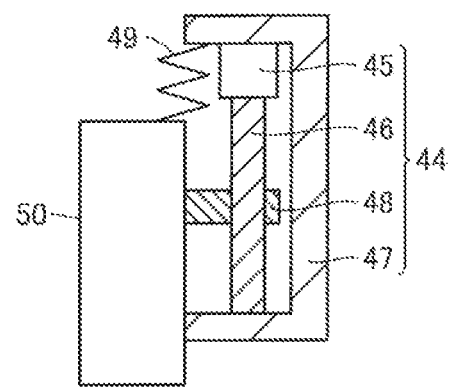
FIG. 6 is a schematic partial enlarged cross-sectional view of a third driver included in a laser processing apparatus in embodiment 1 of the present invention.

With reference to FIG. 6, a second stretchable protective cover 49 may cover the clearance between fourth base 47 and head 50. Second stretchable protective cover 49 prevents first liquid 73 used at the time of laser processing and the debris generated during laser processing, from adhering to third motor 45 and third ball screw 46.

Figure 5:
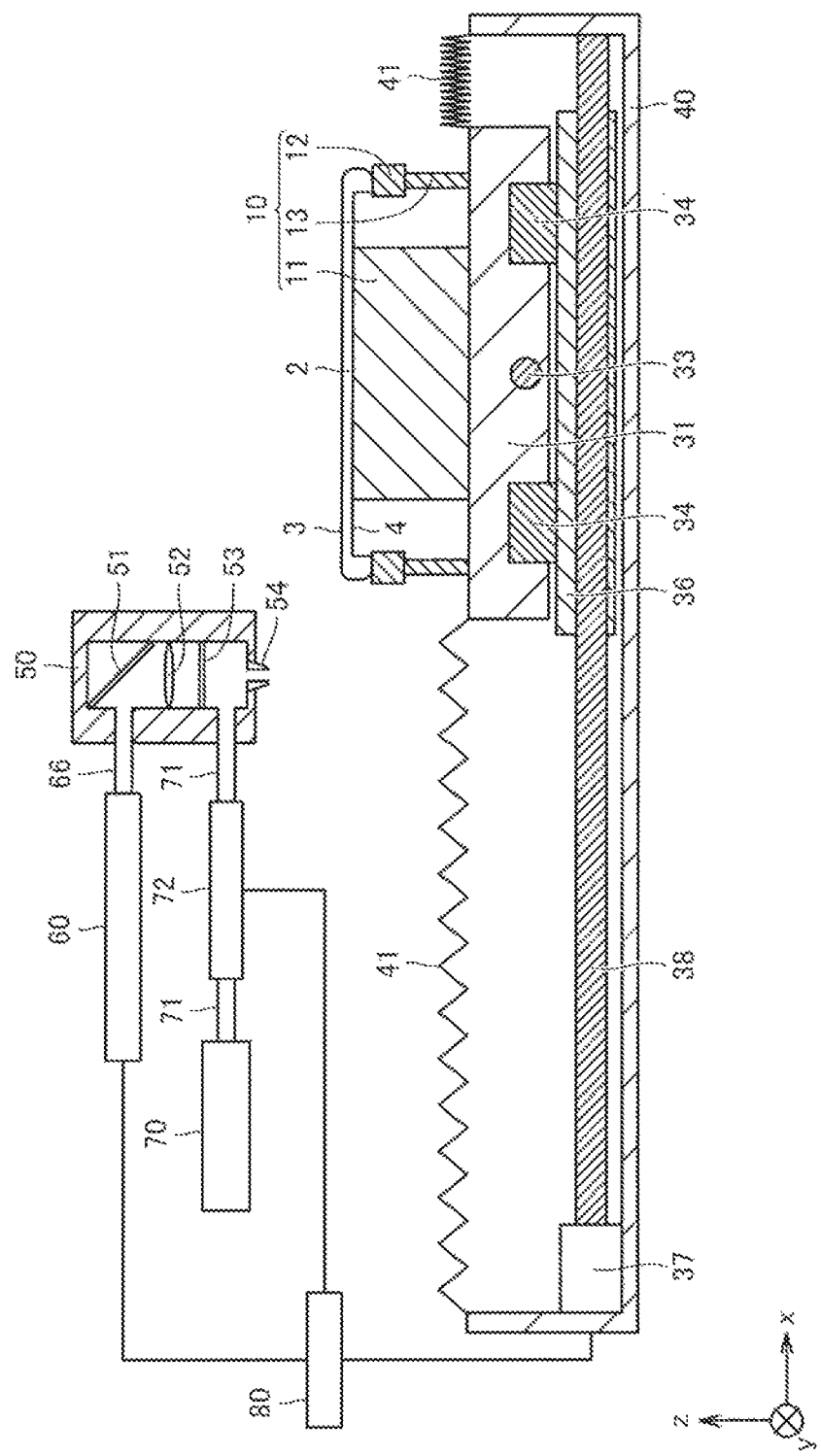
FIG. 5 is a schematic cross-sectional view, taken along cross-sectional line V-V shown in FIG. 2, of a laser processing apparatus in embodiment 1 of the present invention.

With reference to FIG. 5 and FIG. 8, a liquid reservoir 70 is connected to head 50. In particular, liquid reservoir 70 may be connected to head 50 via a first pipe 71 and a first pump 72. First pump 72 is configured to operate switchably between a third state in which first liquid 73 is supplied from liquid reservoir 70 to head 50, and a fourth state in which first liquid 73 from liquid reservoir 70 is blocked. Transparent window 53 keeps first liquid 73 out of mirror 51 and lens 52. First liquid 73 supplied from liquid reservoir 70 to head 50 is supplied from first nozzle 54 to first portion 82 of first main surface 3 of workpiece 2. By supplying first liquid 73 to first portion 82 of first main surface 3 of workpiece 2, liquid column (73) is formed between first nozzle 54 and first portion 82. By supplying first liquid 73 to first portion 82, first liquid 73 spreads over first main surface 3, so that a liquid layer 79 is formed on first main surface 3.

With reference to FIG. 1, FIG. 2, FIG. 5, and FIG. 8 to FIG. 10, driver 29 is configured to drive holder 10 in such a manner that workpiece 2 can revolve around the optical axis 25 of laser beam 62 at first portion 82. By driver 29 driving holder 10 in such a manner that holder 10 can revolve around optical axis 25 of laser beam 62 at first portion 82, workpiece 2 revolves along the locus 26 of the center of workpiece 2. In this specification, the revolution of workpiece 2 refers to a circular motion or an elliptic motion of workpiece 2 around first portion 82 of workpiece 2. In particular, workpiece 2 may make a circular motion around first portion 82 with a radius of $r_1$. The velocity of the revolution of workpiece 2 may be constant or may be variable. Driver 29 may be configured to maintain the orientation of workpiece 2 while workpiece 2 is revolving.

Driver 29 may include a first driver 30 and a second driver 35, but this is not a limitation. First driver 30 is configured to move holder 10 in a first direction (y direction). Specifically, first driver 30 may include first base 31, a first motor 32, a first ball screw 33, and a first guide rail 34. Holder 10 is fixed to first base 31. First ball screw 33 and first guide rail 34 extend in the first direction (y direction). First guide rail 34 is fixed to a second base 36. First ball screw 33 is screwed into first base 31. First motor 32 rotates first ball screw 33. Accordingly, first base 31 is movable in the first direction (y direction) in which first ball screw 33 and first guide rail 34 extend.

Second driver 35 is configured to move holder 10 in a second direction (x direction) that intersects the first direction (y direction). Specifically, second driver 35 may include second base 36, a second motor 37, a second ball screw 38, and a second guide rail 39. Second guide rail 39 is fixed to a third base 40. Second ball screw 38 and second guide rail 39 extend in the second direction (x direction). Second ball screw 38 is screwed into second base 36. Second motor 37 rotates second ball screw 38. Accordingly, second base 36 is movable in the second direction (x direction) in which second ball screw 38 and second guide rail 39 extend.

With reference to FIG. 5, a first stretchable protective cover 41 may cover the clearance between first base 31 and third base 40. First stretchable protective cover 41 prevents first liquid 73 used at the time of laser processing and the debris generated during laser processing, from adhering to first motor 32, first ball screw 33, first guide rail 34, second motor 37, second ball screw 38, and second guide rail 39.

With reference to FIG. 5 and FIG. 8, controller 80 is connected to laser source unit 60 and first pump 72. Controller 80 controls the operation of laser source unit 60. For example, controller 80 switches the operation of shutter 63 included in laser source unit 60, between a first state in which laser beam 62 is transmitted and a second state in which laser beam 62 is blocked. Controller 80 controls the operation of first pump 72. For example, controller 80 switches first pump 72 between a third state in which first liquid 73 is supplied from liquid reservoir 70 to head 50 and a fourth state in which first liquid 73 from liquid reservoir 70 is blocked.

Controller 80 is configured to control driver 29 in such a manner that workpiece 2 can revolve around optical axis 25 of laser beam 62 at first portion 82. In particular, controller 80 may be configured to control driver 29 in such a manner that the orientation of workpiece 2 is maintained while workpiece 2 is revolving around optical axis 25 of laser beam 62. Specifically, controller 80 is connected to first motor 32 and second motor 37. Controller 80 controls first motor 32 and second motor 37 in such a manner that holder 10 can revolve around optical axis 25 of laser beam 62. In particular, controller 80 may control first motor 32 and second motor 37 in such a manner that the orientation of workpiece 2 is maintained while workpiece 2 is revolving around optical axis 25 of laser beam 62. Controller 80 is further connected to third motor 45. Controller 80 controls third motor 45 to adjust the position of head 50 in the height direction (z direction) relative to workpiece 2 or holder 10.

With reference mainly to FIG. 5, FIG. 8, FIG. 10, and FIG. 11, a laser processing method using laser processing apparatus 1 in the present embodiment is described.

The laser processing method in the present embodiment includes supplying first liquid 73 from first nozzle 54 to first portion 82 of first main surface 3 of workpiece 2. Specifically, controller 80 switches first pump 72 to the third state in which first liquid 73 is supplied from liquid reservoir 70 to head 50, thus supplying first liquid 73 from liquid reservoir 70 to head 50. First liquid 73 supplied to head 50 is supplied from first nozzle 54 to first portion 82 of first main surface 3 of workpiece 2. The supplying of first liquid 73 includes forming liquid column (73) between first nozzle 54 and first portion 82, and forming liquid layer 79 on first main surface 3 of workpiece 2. First liquid 73 may be supplied to first portion 82 of first main surface 3 before first portion 82 of first main surface 3 is irradiated with laser beam 62.

The laser processing method in the present embodiment further includes irradiating first portion 82 with laser beam 62 while revolving workpiece 2 around optical axis 25 of laser beam 62 at first portion 82. Specifically, controller 80 switches shutter 63 to the first state in which laser beam 62 is transmitted, so that first portion 82 of workpiece 2 is irradiated with laser beam 62. Controller 80 controls first motor 32 and second motor 37 in such a manner that workpiece 2 and holder 10 can revolve around optical axis 25 of laser beam 62 at first portion 82. In particular, the orientation of workpiece 2 may be maintained while workpiece 2 is revolving around optical axis 25 of laser beam 62. Laser beam 62 may propagate through liquid column (73) to irradiate first portion 82.

First liquid 73 may continue being supplied to first portion 82 from the time before first portion 82 is irradiated with laser beam 62. Workpiece 2 and holder 10 may start revolving at the same time as the irradiation of first portion 82 with laser beam 62 is started. Workpiece 2 and holder 10 may continue revolving from the time before the irradiation of first portion 82 with laser beam 62 is started. First liquid 73 may start to be supplied to first portion 82 at the same time as workpiece 2 and holder 10 start revolving. First liquid 73 may continue being supplied to first portion 82 from the time before workpiece 2 and holder 10 start revolving.

When first portion 82 is irradiated with laser beam 62, workpiece 2 is revolving around optical axis 25 of laser beam 62 at first portion 82. The revolution of workpiece 2 exerts a centrifugal force 27 on liquid layer 79 on first main surface 3. Due to this centrifugal force 27, the thickness of liquid layer 79 is smallest at first portion 82 and increases with distance from first portion 82. Therefore, diffusion and attenuation of laser beam 62 due to liquid layer 79 can be reduced. First main surface 3 of workpiece 2 is prevented from being exposed through liquid layer 79. Liquid layer 79 immediately cools and washes away the debris generated by processing workpiece 2 with laser beam 62. The debris is, for example, melted material of workpiece 2. If the orientation of workpiece 2 is maintained while workpiece 2 is revolving around optical axis 25 of laser beam 62, the thickness distribution of liquid layer 79 can be stably maintained while workpiece 2 is revolving around optical axis 25 of laser beam 62.

The laser processing method in the present embodiment may further include stopping the irradiation of workpiece 2 with laser beam 62 and stopping the revolution of workpiece 2. Specifically, controller 80 switches shutter 63 to the second state in which laser beam 62 is blocked, thus stopping the irradiation of workpiece 2 with laser beam 62. Controller 80 stops first motor 32 and second motor 37, and stops the revolution of workpiece 2 and holder 10. The revolution of workpiece 2 and holder 10 may be stopped at the same time as the irradiation with laser beam 62 is stopped. The revolution of workpiece 2 and holder 10 may be stopped after the irradiation with laser beam 62 is stopped.

The advantageous effects of laser processing apparatus 1 and the laser processing method in the present embodiment will now be described.

Laser processing apparatus 1 in the present embodiment includes holder 10, head 50, first nozzle 54, and driver 29. Holder 10 is configured to hold workpiece 2. Head 50 is configured to irradiate first portion 82 of the main surface (first main surface 3) of workpiece 2 with laser beam 62. First nozzle 54 is configured to supply first liquid 73 to first portion 82 of the main surface (first main surface 3) of workpiece 2. Driver 29 is configured to drive holder 10 in such a manner that workpiece 2 can revolve around optical axis 25 of laser beam 62 at first portion 82.

The revolution of workpiece 2 exerts centrifugal force 27 on liquid layer 79 formed on the main surface (first main surface 3) by supplying first liquid 73 onto the main surface (first main surface 3). Due to this centrifugal force 27, the thickness of liquid layer 79 is smallest at first portion 82 and increases with distance from first portion 82. Therefore, diffusion and attenuation of laser beam 62 due to liquid layer 79 can be reduced. Also, the main surface (first main surface 3) is prevented from being exposed through liquid layer 79. Liquid layer 79 immediately cools and washes away the debris generated by processing workpiece 2 with laser beam 62. According to laser processing apparatus 1 in the present embodiment, workpiece 2 can be efficiently processed, and the debris generated from workpiece 2 during laser processing of workpiece 2 can be prevented from adhering to the main surface (first main surface 3) of workpiece 2.

In laser processing apparatus 1 in the present embodiment, first liquid 73 is supplied onto first main surface 3 of workpiece 2 only from first nozzle 54. Laser processing apparatus 1 in the present embodiment can reduce the amount of first liquid 73 required to form liquid layer 79 having a thickness distribution such that the thickness is smallest at first portion 82 and increases with distance from first portion 82. Further, laser processing apparatus 1 in the present embodiment can simplify the liquid supply equipment, such as first pipe 71 and first pump 72, required to form such a thickness distribution of liquid layer 79.

In laser processing apparatus 1 in the present embodiment, first nozzle 54 may be provided on head 50 in such a manner that laser beam 62 can be emitted from first nozzle 54 and can propagate through liquid column (73) formed by first liquid 73 between first nozzle 54 and first portion 82. Accordingly, laser beam 62 is stably guided to first portion 82 of workpiece 2 through liquid column (73). Also, the heat generated at first portion 82 at the time of laser processing is cooled by first liquid 73. Laser processing apparatus 1 in the present embodiment can improve the quality of laser-processed workpiece 2.

In laser processing apparatus 1 in the present embodiment, driver 29 may be configured to maintain the orientation of workpiece 2 while workpiece 2 is revolving. Accordingly, the thickness distribution of liquid layer 79 can be stably maintained while workpiece 2 is revolving. According to laser processing apparatus 1 in the present embodiment, diffusion and attenuation of laser beam 62 due to liquid layer 79 can be reduced, and the debris generated from workpiece 2 can be prevented from adhering to the main surface (first main surface 3) of workpiece 2.

The laser processing method in the present embodiment includes supplying first liquid 73 from first nozzle 54 to first portion 82 of the main surface (first main surface 3) of workpiece 2, and irradiating first portion 82 with laser beam 62 while revolving workpiece 2 around optical axis 25 of laser beam 62 at first portion 82.

The revolution of workpiece 2 exerts centrifugal force 27 on liquid layer 79 formed on the main surface (first main surface 3) by supplying first liquid 73 onto the main surface (first main surface 3). Due to this centrifugal force 27, the thickness of liquid layer 79 is smallest at first portion 82 and increases with distance from first portion 82. Therefore, diffusion and attenuation of laser beam 62 due to liquid layer 79 can be reduced. Also, the main surface (first main surface 3) is prevented from being exposed through liquid layer 79. Liquid layer 79 immediately cools and washes away the debris generated by processing workpiece 2 with laser beam 62. According to the laser processing method in the present embodiment, workpiece 2 can be efficiently processed, and the debris generated from workpiece 2 during laser processing of workpiece 2 can be prevented from adhering to the main surface of workpiece 2.

In the laser processing method in the present embodiment, first liquid 73 is supplied onto first main surface 3 of workpiece 2 only from first nozzle 54. The laser processing method in the present embodiment can reduce the amount of first liquid 73 required to form liquid layer 79 having a thickness distribution such that the thickness is smallest at first portion 82 and increases with distance from first portion 82. Further, the laser processing method in the present embodiment can simplify the liquid supply equipment, such as first pipe 71 and first pump 72, required to form such a thickness distribution of liquid layer 79.

In the laser processing method in the present embodiment, the laser beam may be emitted from the first nozzle and propagate through the liquid column formed by the first liquid between the first nozzle and the first portion. Accordingly, laser beam 62 is stably guided to first portion 82 of workpiece 2 through liquid column (73). Also, the heat generated at first portion 82 at the time of laser processing is cooled by first liquid 73. The laser processing method in the present embodiment can improve the quality of laser-processed workpiece 2.

In the laser processing method in the present embodiment, first liquid 73 may continue being supplied to first portion 82 from the time before first portion 82 is irradiated with laser beam 62. Since liquid layer 79 is formed on first main surface 3 before first portion 82 is irradiated with laser beam 62, liquid layer 79 immediately cools and washes away the debris generated by processing workpiece 2 with laser beam 62. According to the laser processing method in the present embodiment, workpiece 2 can be efficiently processed, and the debris generated from workpiece 2 during laser processing of workpiece 2 can be prevented from adhering to the main surface of workpiece 2.

In the laser processing method in the present embodiment, the orientation of the workpiece may be maintained while the workpiece is revolving. Accordingly, the thickness distribution of liquid layer 79 can be stably maintained while workpiece 2 is revolving. According to the laser processing method in the present embodiment, diffusion and attenuation of laser beam 62 due to liquid layer 79 can be reduced, and the debris generated from workpiece 2 can be prevented from adhering to the main surface (first main surface 3) of workpiece 2.

Embodiment 2

Figure 12:
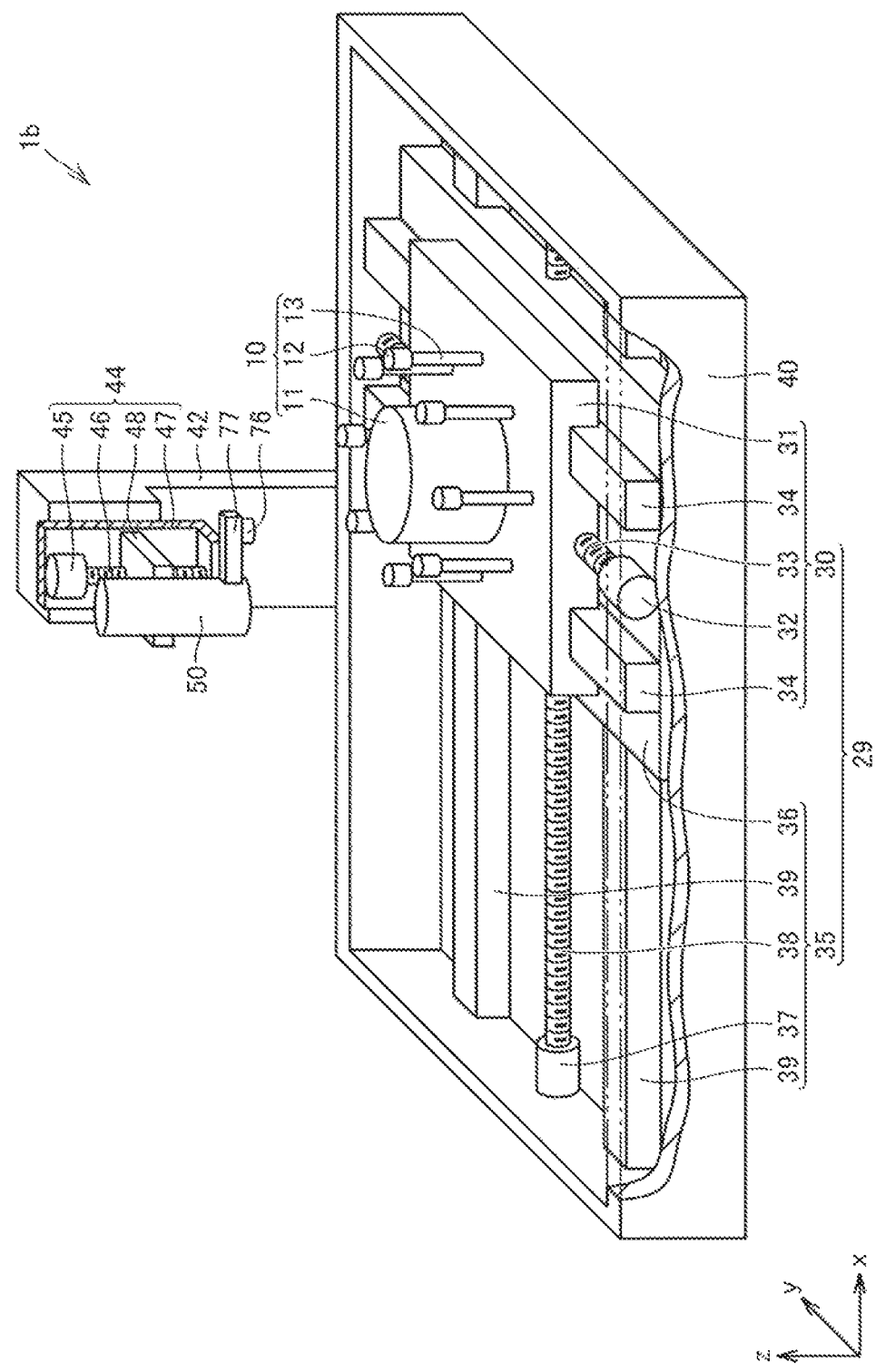
FIG. 12 is a schematic perspective view of a laser processing apparatus in embodiment 2 of the present invention.
Figure 13:
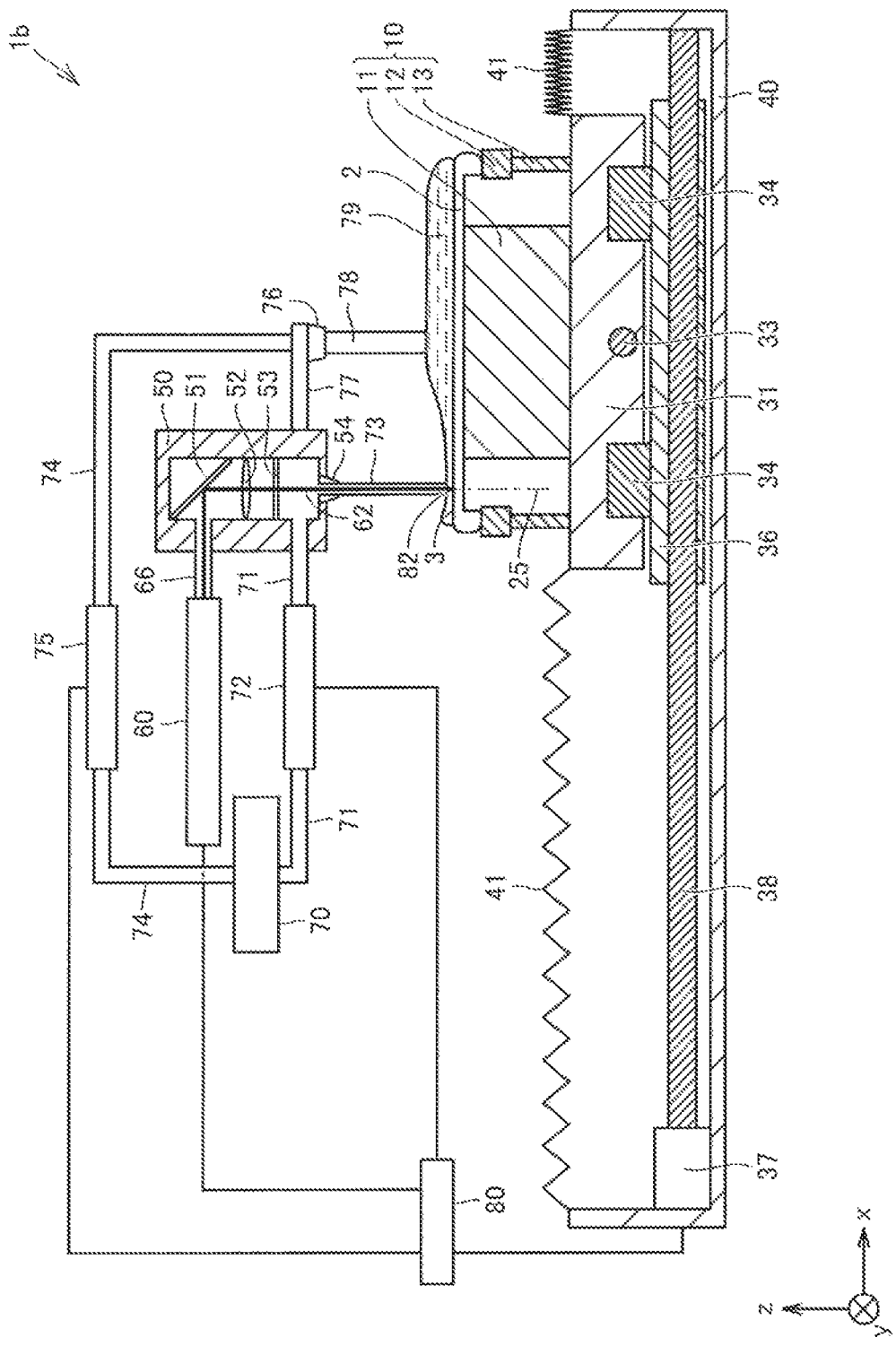
FIG. 13 is a schematic cross-sectional view of a laser processing apparatus in embodiment 2 of the present invention.

With reference to FIG. 12 and FIG. 13, a laser processing apparatus 1b in embodiment 2 is described. Laser processing apparatus 1b in the present embodiment is similar in configuration to laser processing apparatus 1 in embodiment 1, but is different mainly in the following respects.

Laser processing apparatus 1b further includes a second nozzle 76 configured to supply a second liquid 78 to a second portion of first main surface 3 different from first portion 82. Second nozzle 76 may be attached to head 50 via a second arm 77, but this is not a limitation. Second nozzle 76 is connected to liquid reservoir 70. In particular, second nozzle 76 may be connected to liquid reservoir 70 via a second pipe 74 and a second pump 75. Second pump 75 is configured to operate switchably between a fifth state in which second liquid 78 is supplied from liquid reservoir 70 to second nozzle 76, and a sixth state in which second liquid 78 from liquid reservoir 70 is blocked. The material of second liquid 78 may be the same as the material of first liquid 73.

The second supply rate of second liquid 78 may be higher than the first supply rate of first liquid 73. For example, the second supply rate of second liquid 78 may be ten or more times, or twenty or more times higher than the first supply rate of first liquid 73. Second nozzle 76 may have a larger opening area than first nozzle 54. For example, the opening area of second nozzle 76 may be ten or more times, or twenty or more times larger than the opening area of first nozzle 54.

With reference to FIG. 13, controller 80 is connected to second pump 75. Controller 80 controls the operation of second pump 75. For example, controller 80 is configured to switch second pump 75 between a fifth state in which liquid 78 is supplied from liquid reservoir 70 to second nozzle 76, and a sixth state in which second liquid 78 supplied from liquid reservoir 70 is blocked.

Figure 14:
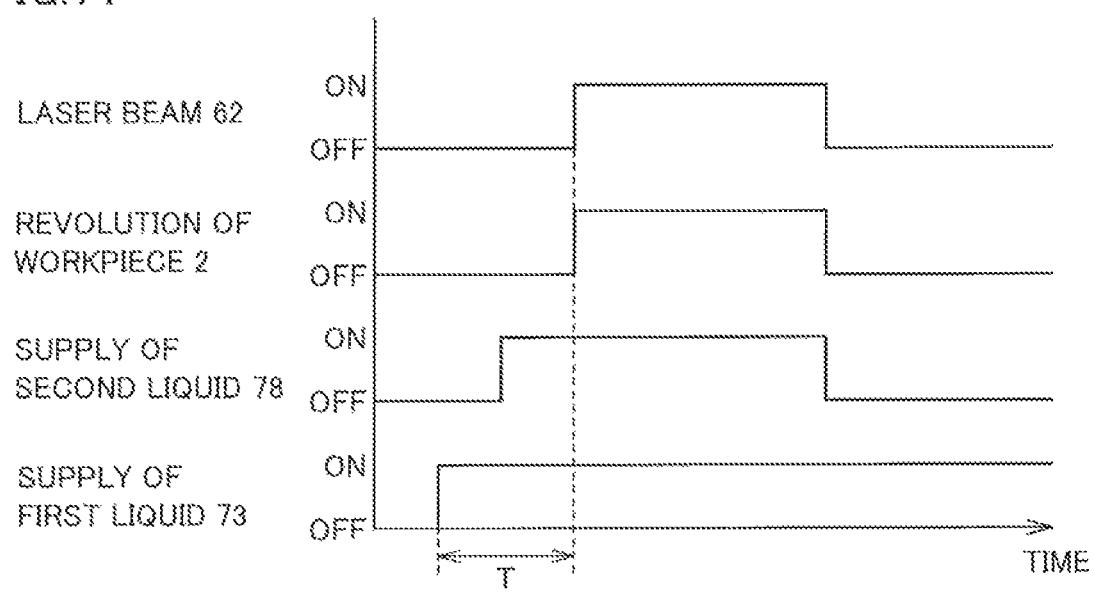
FIG. 14 shows a timing chart of a laser processing method in embodiment 2 of the present invention.

With reference to FIG. 13 and FIG. 14, a laser processing method in embodiment 2 is described. The laser processing method in the present embodiment includes steps similar to those of the laser processing method in embodiment 1, but is different mainly in the following respects.

The laser processing method in the present embodiment further includes supplying second liquid 78 from second nozzle 76 to the second portion of first main surface 3 different from first portion 82 before irradiating first portion 82 with laser beam 62. Specifically, controller 80 switches second pump 75 to the fifth state in which second liquid 78 is supplied from liquid reservoir 70 to second nozzle 76, thus supplying second liquid 78 from liquid reservoir 70 to second nozzle 76. Second liquid 78 supplied to second nozzle 76 is supplied from second nozzle 76 to the second portion of first main surface 3 different from first portion 82. Second liquid 78 may start to be supplied to the second portion of first main surface 3 different from first portion 82 after first liquid 73 starts to be supplied to first portion 82 and before first portion 82 of first main surface 3 is irradiated with laser beam 62.

The second supply rate of second liquid 78 may be higher than the first supply rate of first liquid 73. For example, the second supply rate of second liquid 78 may be ten or more times, or twenty or more times higher than the first supply rate of first liquid 73.

The laser processing method in the present embodiment may include stopping the irradiation of workpiece 2 with laser beam 62, and stopping the supply of second liquid 78 from second nozzle 76 to the second portion of first main surface 3 different from first portion 82. Specifically, controller 80 switches shutter 63 to the second state in which laser beam 62 is blocked, thus stopping the irradiation of workpiece 2 with laser beam 62. Controller 80 switches second pump 75 to the sixth state in which second liquid 78 supplied from liquid reservoir 70 is blocked, thus stopping supply of second liquid 78 from second nozzle 76 to first main surface 3. The supply of second liquid 78 from second nozzle 76 may be stopped at the same time as the irradiation with laser beam 62 is stopped. The supply of second liquid 78 from second nozzle 76 may be stopped after the irradiation with laser beam 62 is stopped.

Laser processing apparatus 1b in the present embodiment brings about the following advantageous effects in addition to the advantageous effects of laser processing apparatus 1 in embodiment 1. Laser processing apparatus 1b in the present embodiment includes second nozzle 76 configured to supply second liquid 78 to the second portion of the main surface (first main surface 3) different from first portion 82. The second supply rate of second liquid 78 is higher than the first supply rate of first liquid 73. Since liquid layer 79 is formed by first liquid 73 from first nozzle 54 and second liquid 78 from second nozzle 76, the time required to form liquid layer 79 on first main surface 3 of workpiece 2 can be shortened. Time T before first portion 82 of first main surface 3 is irradiated with laser beam 62 can be shortened. According to laser processing apparatus 1b in the present embodiment, workpiece 2 can be efficiently processed.

The laser processing method in the present embodiment brings about the following advantageous effects in addition to the advantageous effects of the laser processing method in embodiment 1. The laser processing method in the present embodiment further includes supplying second liquid 78 from second nozzle 76 to the second portion of the main surface (first main surface 3) different from first portion 82 before irradiating first portion 82 with laser beam 62. The second supply rate of second liquid 78 may be higher than the first supply rate of first liquid 73. Since liquid layer 79 is formed by first liquid 73 from first nozzle 54 and second liquid 78 from second nozzle 76, the time required to form liquid layer 79 on first main surface 3 of workpiece 2 can be shortened. Time T before first portion 82 of first main surface 3 is irradiated with laser beam 62 can be shortened. According to the laser processing method in the present embodiment, workpiece 2 can be efficiently processed.

Embodiment 3

Figure 15:
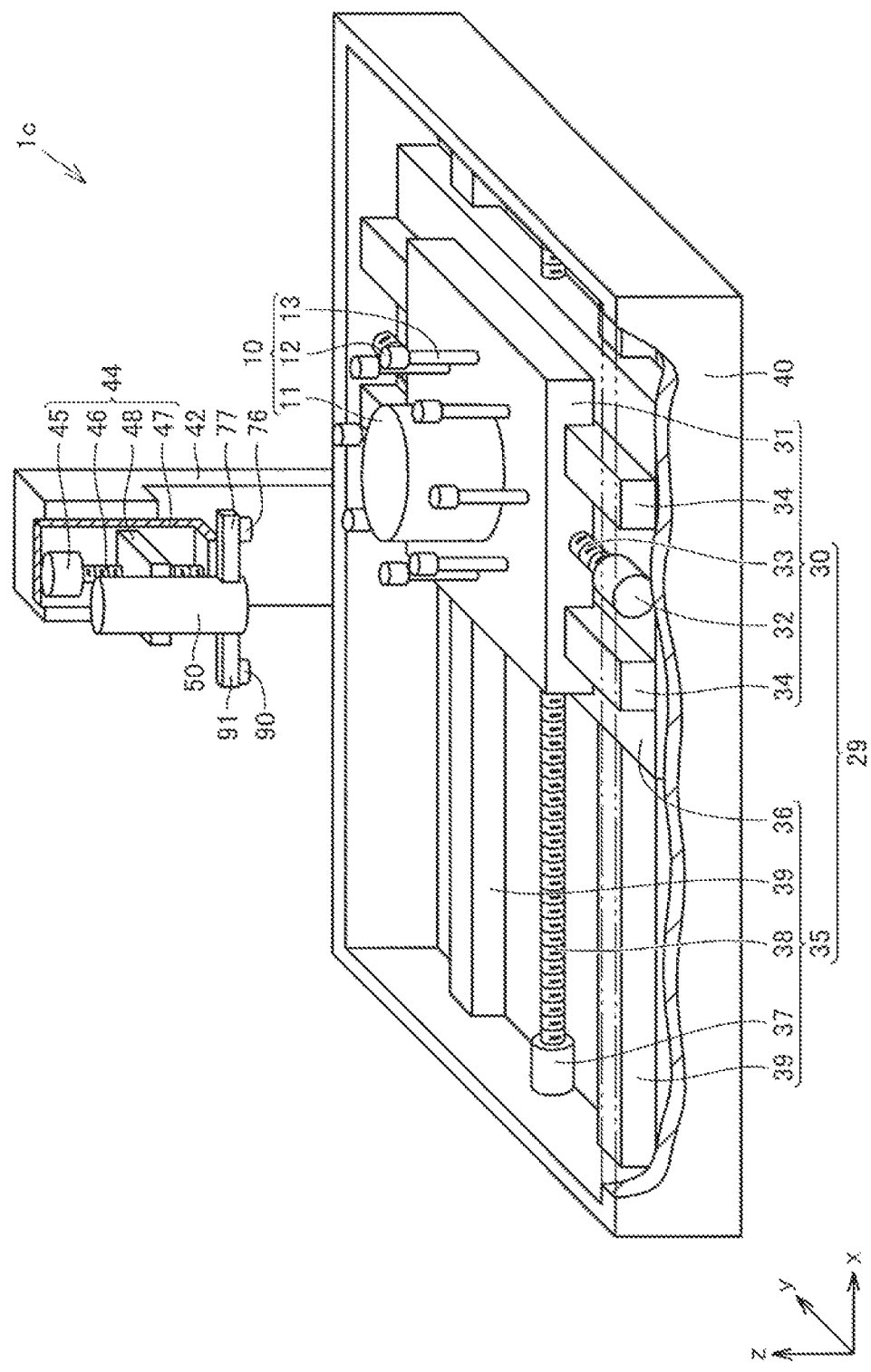
FIG. 15 is a schematic perspective view of a laser processing apparatus in embodiment 3 of the present invention.
Figure 16:
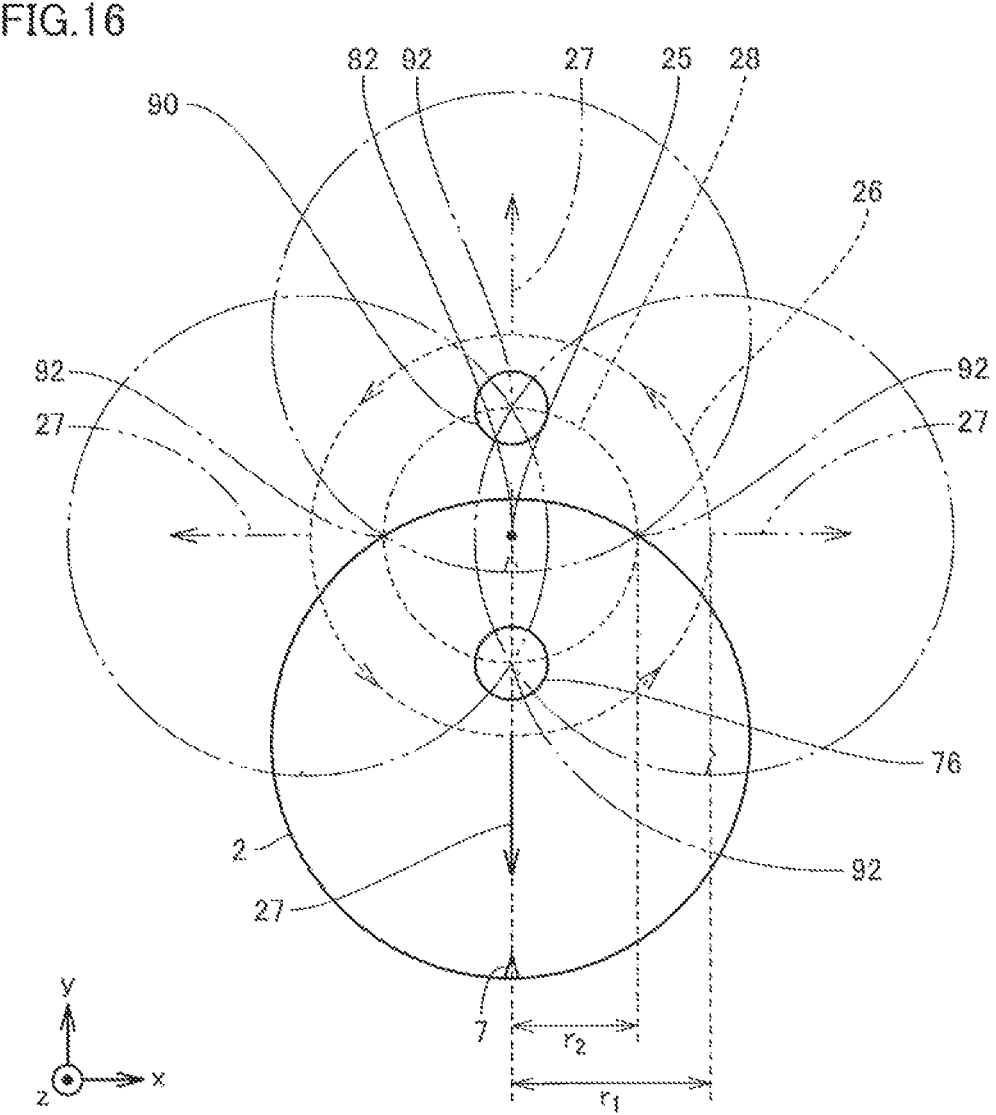
FIG. 16 is a plan view showing revolution of a workpiece and a position of a second nozzle in a laser processing apparatus in embodiment 3 of the present invention.
Figure 17:
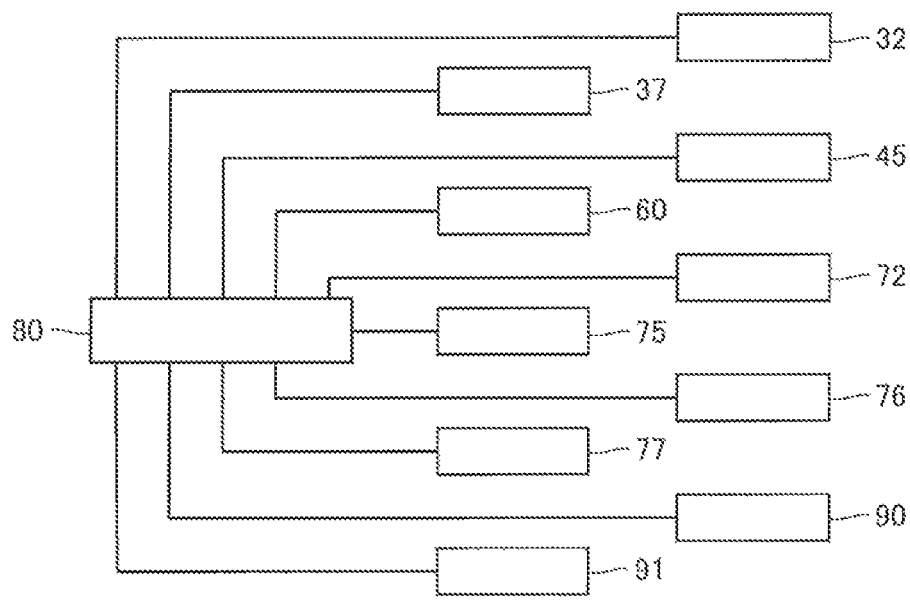
FIG. 17 is a control circuit block diagram in a laser processing apparatus in embodiment 3 of the present invention.

With reference to FIG. 15 to FIG. 17, a laser processing apparatus 1c in embodiment 3 is described. Laser processing apparatus 1c in the present embodiment is similar in configuration to laser processing apparatus 1b in embodiment 2, but is different mainly in the following respects.

Laser processing apparatus 1c further includes a plurality of second nozzles 76, 90 configured to supply second liquid 78 toward first main surface 3 other than first portion 82. The number of a plurality of second nozzles 76, 90 is not limited to two but may be three or more.

Second nozzle 76 may be attached to head 50 via second arm 77, but this is not a limitation. Second nozzle 90 may be attached to head 50 via a third arm 91, but this is not a limitation. A plurality of second nozzles 76, 90 are connected to liquid reservoir 70 (not shown). A plurality of second nozzles 76, 90 are configured to operate switchably between a seventh state in which second liquid 78 is supplied toward first main surface 3 other than first portion 82, and an eighth state in which second liquid 78 is blocked. Second arm 77 may be configured to change its length in accordance with the revolution of workpiece 2. Third arm 91 may be configured to change its length in accordance with the revolution of workpiece 2.

The second supply rate of second liquid 78 may be higher than the first supply rate of first liquid 73. For example, the second supply rate of second liquid 78 may be ten or more times, or twenty or more times higher than the first supply rate of first liquid 73.

A plurality of second nozzles 76, 90 are disposed in such a manner that, while workpiece 2 is revolving, second liquid 78 can continue being supplied toward the main surface (first main surface 3) other than first portion 82. In particular, in plan view of first main surface 3, a plurality of second nozzles 76, 90 may be disposed on a closed loop 28. In further particular, in plan view of first main surface 3, a plurality of second nozzles 76, 90 may be evenly spaced on closed loop 28 around first portion 82. Closed loop 28 is formed by a line of intersection points 92 in plan view of first main surface 3. Each intersection point 92 is a point at which the first outer edge of workpiece 2 at a first position in the revolution intersects the second outer edge of workpiece 2 at a second position apart from the first position by 180° revolution. The first position is any position in the revolution of workpiece 2. By workpiece 2 making one-round revolution, a line of intersection points 92 is formed. While workpiece 2 is revolving, a part of a plurality of second nozzles 76, 90 continues facing first main surface 3 other than first portion 82.

In particular, the revolution of workpiece 2 may be a circular motion around first portion 82, closed loop 28 may be a circle's circumference (28), and a plurality of second nozzles 76, 90 may be disposed on circle's circumference (28) around first portion 82 in plan view of first main surface 3. In further particular, in plan view of first main surface 3, a plurality of second nozzles 76, 90 may be evenly spaced on circle's circumference (28) around first portion 82. Radius $r_2$ of circle's circumference (28) is equal to the distance between intersection point 92 and first portion 82 in plan view of first main surface 3.

Controller 80 controls the open/closed status of each of a plurality of second nozzles 76, 90. Controller 80 is configured to switch each of a plurality of second nozzles 76, 90 between a seventh state in which passage of the second liquid is allowed, and an eighth state in which the second liquid is blocked. Controller 80 may be configured to, throughout the revolution of workpiece 2, supply second liquid 78 from a part of a plurality of second nozzles 76, 90 and stop supply of second liquid 78 from the remaining part of a plurality of second nozzles 76, 90. Controller 80 may be configured to change the length of second arm 77 and the length of third arm 91 in accordance with the revolution of workpiece 2.

With reference to FIG. 15 to FIG. 18, a laser processing method in embodiment 3 is described. The laser processing method in the present embodiment includes steps similar to those of the laser processing method in embodiment 2, but is different mainly in the following respects.

The laser processing method in the present embodiment includes supplying second liquid 78 from a plurality of second nozzles 76, 90 toward first main surface 3 other than first portion 82 before irradiating first portion 82 with laser beam 62. Specifically, controller 80 switches second pump 75 to the fifth state in which second liquid 78 is supplied from liquid reservoir 70 to a plurality of second nozzles 76, 90, thus supplying second liquid 78 from liquid reservoir 70 to a plurality of second nozzles 76, 90. Controller 80 switches a plurality of second nozzles 76, 90 to the seventh state in which second liquid 78 is supplied toward first main surface 3 other than first portion 82, thus supplying second liquid 78 from a plurality of second nozzles 76, 90 toward first main surface 3 other than first portion 82.

The second supply rate of second liquid 78 may be higher than the first supply rate of first liquid 73. For example, the second supply rate of second liquid 78 may be ten or more times, or twenty or more times higher than the first supply rate of first liquid 73.

A plurality of second nozzles 76, 90 are disposed in such a manner that, while workpiece 2 is revolving, second liquid 78 can continue being supplied toward first main surface 3 other than first portion 82. In particular, in plan view of first main surface 3, a plurality of second nozzles 76, 90 may be disposed on closed loop 28. In further particular, in plan view of first main surface 3, a plurality of second nozzles 76, 90 may be evenly spaced on closed loop 28 around first portion 82. Closed loop 28 is formed by a line of intersection points 92 in plan view of first main surface 3. Each intersection point 92 is a point at which the first outer edge of workpiece 2 at a first position in the revolution intersects the second outer edge of workpiece 2 at a second position apart from the first position by 180° revolution. The first position is any position in the revolution of workpiece 2. By workpiece 2 making one-round revolution, a line of intersection points 92 is formed. While workpiece 2 is revolving, a part of a plurality of second nozzles 76, 90 continues facing first main surface 3 other than first portion 82.

In particular, the revolution of workpiece 2 may be a circular motion around first portion 82, closed loop 28 may be circle's circumference (28), and a plurality of second nozzles 76, 90 may be disposed on circle's circumference (28) around first portion 82 in plan view of first main surface 3. In further particular, in plan view of first main surface 3, a plurality of second nozzles 76, 90 may be evenly spaced on circle's circumference (28) around first portion 82. Radius $r_2$ of circle's circumference (28) is equal to the distance between intersection point 92 and first portion 82 in plan view of first main surface 3.

Figure 18:
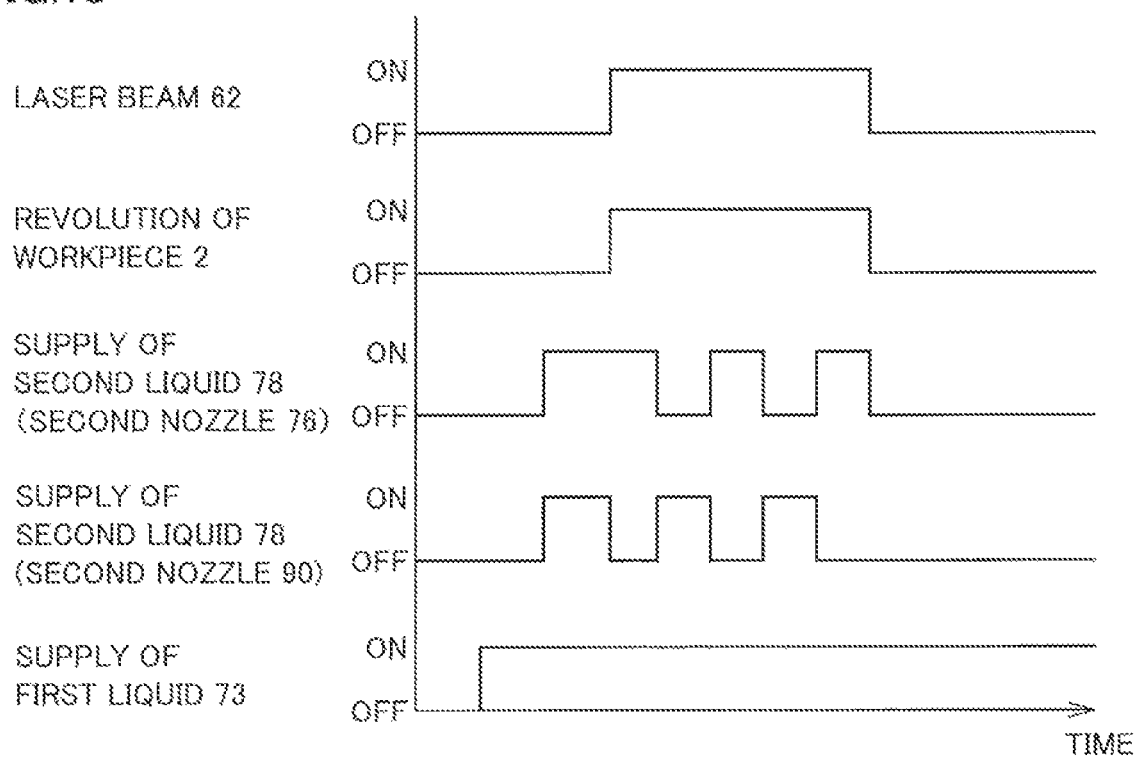
FIG. 18 shows a timing chart of a laser processing method in embodiment 3 of the present invention.

In the laser processing method in the present embodiment, the supplying of second liquid 78 may include, throughout the revolution of workpiece 2, supplying second liquid 78 from a part of a plurality of second nozzles 76, 90 and stopping supply of second liquid 78 from the remaining part of a plurality of second nozzles 76, 90. For example, as shown in FIG. 18, while workpiece 2 is revolving, second liquid 78 is supplied toward first main surface 3 other than first portion 82 alternately from second nozzle 76 and second nozzle 90. Since one or more of a plurality of second nozzles 76, 90 continues facing the main surface (first main surface 3) other than first portion 82 while workpiece 2 is revolving, second liquid 78 continues being supplied toward first main surface 3 other than first portion 82 from a part of a plurality of second nozzles 76, 90.

Laser processing apparatus 1c in the present embodiment brings about the following advantageous effects in addition to the advantageous effects of laser processing apparatus 1b in embodiment 2.

Laser processing apparatus 1c in the present embodiment further includes a plurality of second nozzles 76, 90 configured to supply second liquid 78 toward the main surface (first main surface 3) other than first portion 82. The second supply rate of second liquid 78 is higher than the first supply rate of first liquid 73. A plurality of second nozzles 76, 90 are disposed in such a manner that, while workpiece 2 is revolving, second liquid 78 can continue being supplied toward the main surface (first main surface 3) other than first portion 82. Accordingly, the main surface (first main surface 3) is prevented from being exposed through liquid layer 79. Liquid layer 79 immediately cools and washes away the debris generated by processing workpiece 2 with laser beam 62. According to laser processing apparatus 1c in the present embodiment, the debris generated from workpiece 2 during laser processing of workpiece 2 can be reliably prevented from adhering to the main surface (first main surface 3) of workpiece 2.

In laser processing apparatus 1c in the present embodiment, in plan view of the main surface (first main surface 3), a plurality of second nozzles 76, 90 may be disposed on closed loop 28. Closed loop 28 is formed by a line of intersection points 92. Each intersection point 92 is a point at which the first outer edge of workpiece 2 at a first position in the revolution of workpiece 2 intersects the second outer edge of workpiece 2 at a second position apart from the first position by 180° revolution. By workpiece 2 making one-round revolution, a line of intersection points 92 is formed. Accordingly, while workpiece 2 is revolving, second liquid 78 continues being supplied toward the main surface (first main surface 3) other than first portion 82 from a part of a plurality of second nozzles 76, 90. According to laser processing apparatus 1c in the present embodiment, the debris generated from workpiece 2 during laser processing of workpiece 2 can be reliably prevented from adhering to the main surface (first main surface 3) of workpiece 2.

Laser processing apparatus 1c in the present embodiment further includes controller 80. Controller 80 is configured to, throughout the revolution of workpiece 2, supply second liquid 78 from a part of a plurality of second nozzles 76, 90 and stop supply of second liquid 78 from the remaining part of a plurality of second nozzles 76, 90. According to laser processing apparatus 1c in the present embodiment, the debris generated from workpiece 2 during laser processing of workpiece 2 can be reliably prevented from adhering to the main surface (first main surface 3) of workpiece 2, and the amount of second liquid 78 used can be reduced.

The laser processing method in the present embodiment brings about the following advantageous effects in addition to the advantageous effects of the laser processing method in embodiment 2, but is different mainly in the following respects.

The laser processing method in the present embodiment further includes supplying second liquid 78 from a plurality of second nozzles 76, 90 toward the main surface (first main surface 3) other than first portion 82 before irradiating first portion 82 with laser beam 62. The second supply rate of second liquid 78 may be higher than the first supply rate of first liquid 73. A plurality of second nozzles 76, 90 are disposed in such a manner that, while workpiece 2 is revolving, second liquid 78 can continue being supplied toward the main surface (first main surface 3) other than first portion 82. Accordingly, the main surface (first main surface 3) is prevented from being exposed through liquid layer 79. Liquid layer 79 immediately cools and washes away the debris generated by processing workpiece 2 with laser beam 62. According to the laser processing method in the present embodiment, the debris generated from workpiece 2 during laser processing of workpiece 2 can be reliably prevented from adhering to the main surface (first main surface 3) of workpiece 2.

In the laser processing method in the present embodiment, the supplying of second liquid 78 includes, throughout the revolution of workpiece 2, supplying second liquid 78 from a part of a plurality of second nozzles 76, 90 and stopping supply of second liquid 78 from the remaining part of a plurality of second nozzles 76, 90. According to the laser processing method in the present embodiment, the debris generated from workpiece 2 during laser processing of workpiece 2 can be reliably prevented from adhering to the main surface (first main surface 3) of workpiece 2, and the amount of second liquid 78 used can be reduced.

Embodiment 4

Figure 19:
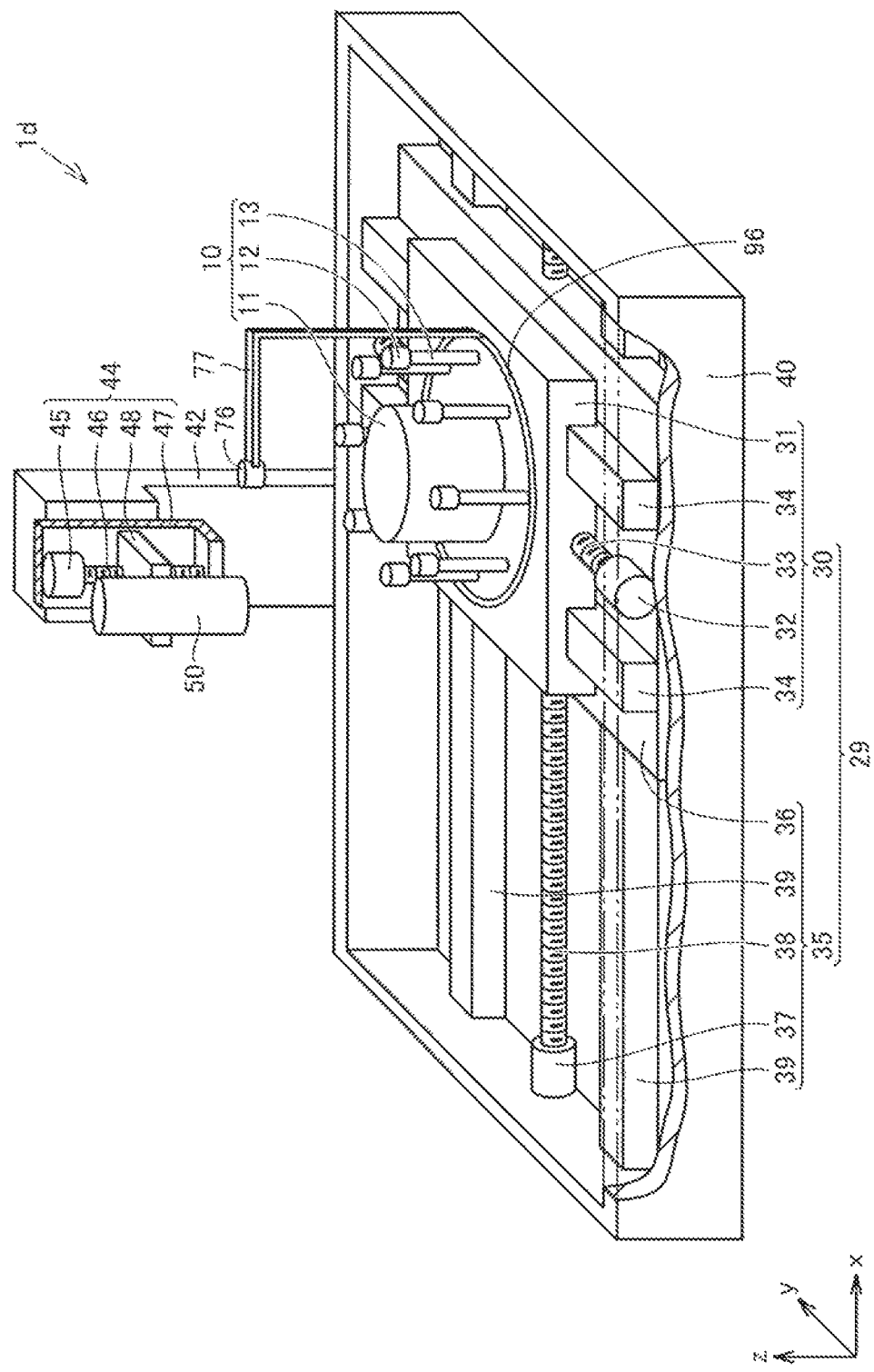
FIG. 19 is a schematic perspective view of a laser processing apparatus in embodiment 4 of the present invention.
Figure 20:
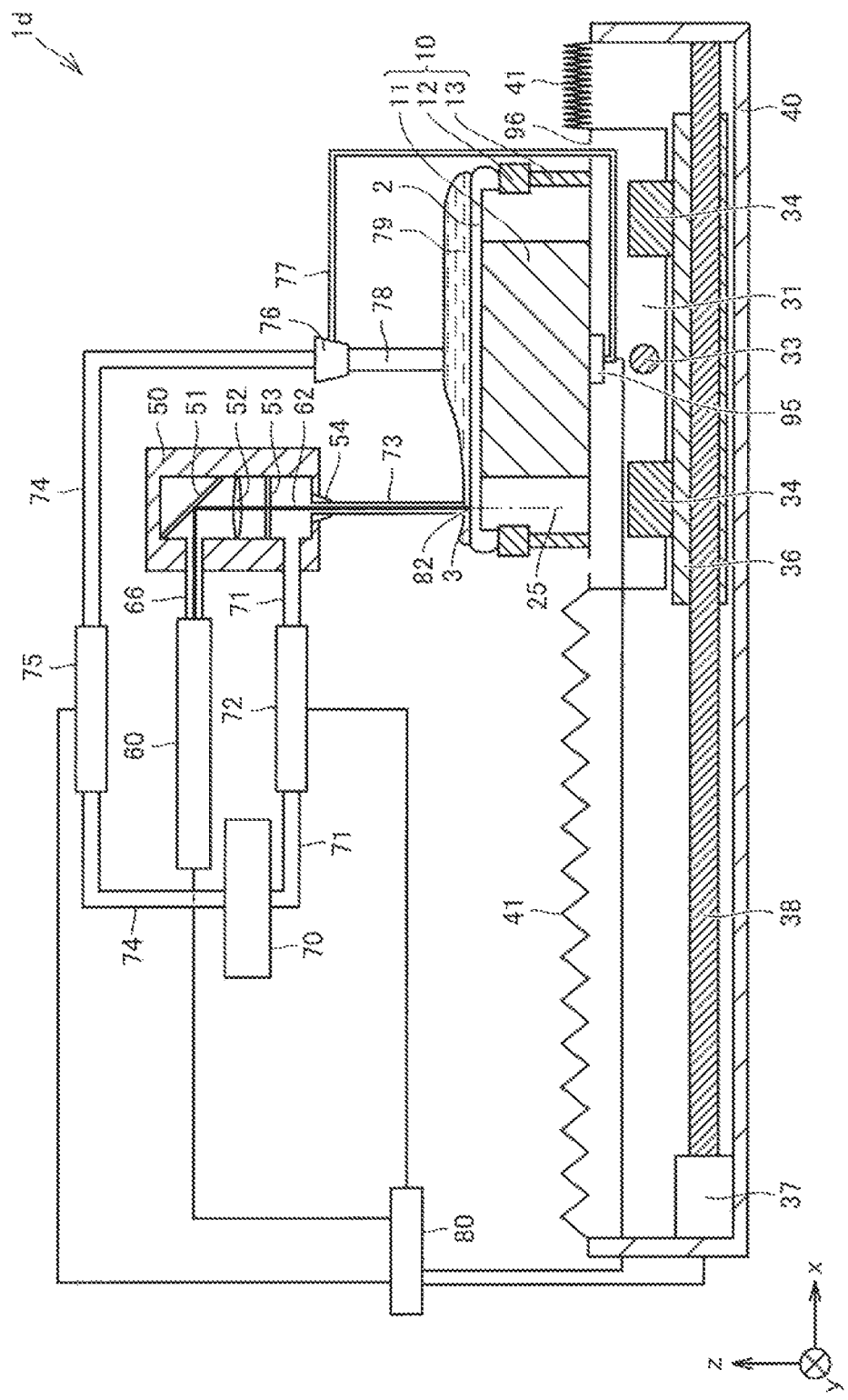
FIG. 20 is a schematic cross-sectional view of a laser processing apparatus in embodiment 4 of the present invention.
Figure 21:
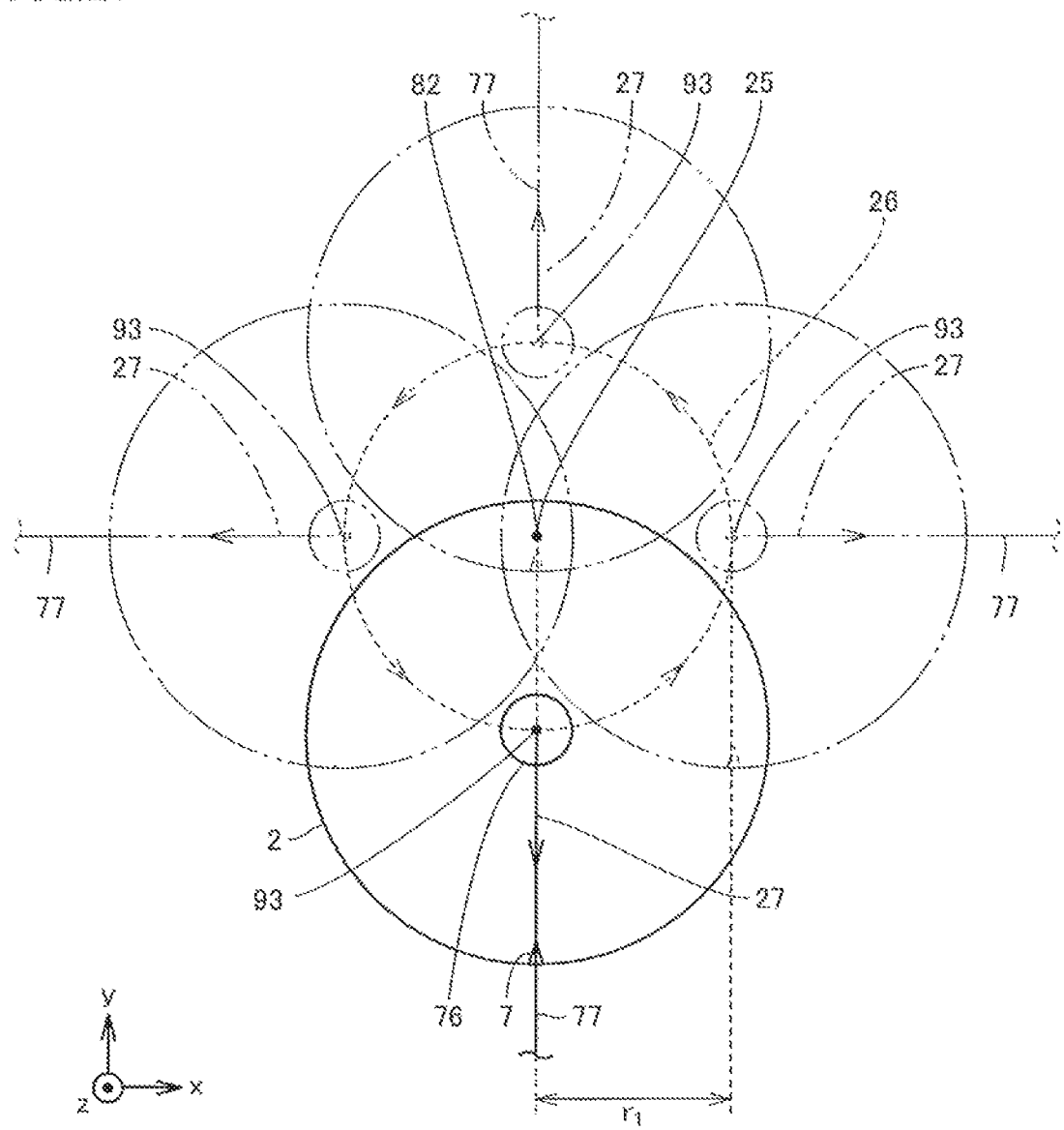
FIG. 21 is a plan view showing revolution of a workpiece and movement of a second nozzle in a laser processing apparatus in embodiment 4 of the present invention.

With reference to FIG. 19 to FIG. 21, a laser processing apparatus 1$d$ in embodiment 4 is described. Laser processing apparatus 1$d$ in the present embodiment is similar in configuration to laser processing apparatus 1$b$ in embodiment 2, but is different mainly in the following respects.

Laser processing apparatus 1$d$ further includes second nozzle 76 configured to supply second liquid 78 to first main surface 3. Second nozzle 76 is configured to be movable relative to holder 10 in such a manner that, while workpiece 2 is revolving, second liquid 78 can continue being supplied to the same spot 93 on first main surface 3 different from first portion 82. In particular, second nozzle 76 may be configured to be movable relative to holder 10 in such a manner that second nozzle 76 revolves in the same way as workpiece 2 in plan view of first main surface 3. The same spot 93 on first main surface 3 may be, but is not limited to, the center of first main surface 3.

Specifically, a fourth driver (95) may include a fourth motor 95. Fourth driver (95) may be attached to the inside of first base 31. Second nozzle 76 may be connected to fourth motor 95 via second arm 77. First base 31 may have a gap 96 formed around holder 10. Gap 96 may have a circular shape, but this is not a limitation. Second arm 77 extends through gap 96.

The second supply rate of second liquid 78 may be higher than the first supply rate of first liquid 73. For example, the second supply rate of second liquid 78 may be ten or more times, or twenty or more times higher than the first supply rate of first liquid 73.

With reference to FIG. 20, controller 80 is further connected to fourth motor 95. Controller 80 controls fourth motor 95 to move second nozzle 76. Controller 80 is configured to move second nozzle 76 in such a manner that, while workpiece 2 is revolving, second liquid 78 can continue being supplied to the same spot 93 on first main surface 3 different from first portion 82. Controller 80 may be configured in such a manner that, while workpiece 2 is revolving, second nozzle 76 revolves in the same way as workpiece 2 in plan view of first main surface 3. For example, controller 80 may be configured in such a manner that, when workpiece 2 makes a circular motion around first portion 82 with a radius of $r_1$ in plan view of first main surface 3, second nozzle 76 makes a circular motion around first portion 82 with a radius of $r_1$ in plan view of first main surface 3.

Figure 22:
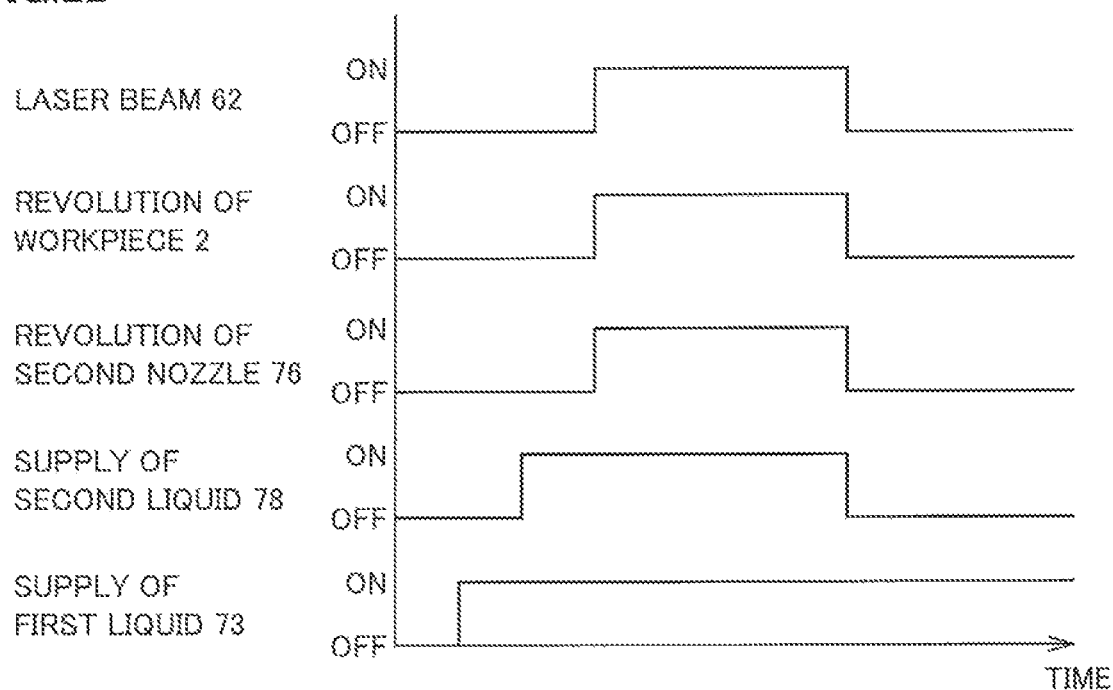
FIG. 22 shows a timing chart of a laser processing method in embodiment 4 of the present invention.

With reference to FIG. 20 to FIG. 22, a laser processing method in embodiment 4 is described. The laser processing method in the present embodiment includes steps similar to those of the laser processing method in embodiment 2, but is different mainly in the following respects.

The laser processing method in the present embodiment includes supplying second liquid 78 from second nozzle 76 to first main surface 3 before irradiating first portion 82 with laser beam 62. Second nozzle 76 moves in such a manner that, while workpiece 2 is revolving, second liquid 78 continues being supplied to the same spot 93 on first main surface 3 different from first portion 82. In particular, second nozzle 76 may move relative to holder 10 in such a manner that, while workpiece 2 is revolving, second nozzle 76 revolves in the same way as workpiece 2 in plan view of first main surface 3. The same spot 93 on first main surface 3 may be, but is not limited to, the center of first main surface 3.

Controller 80 controls fourth motor 95 to move second nozzle 76 in such a manner that, while workpiece 2 is revolving, second liquid 78 continues being supplied to the same spot 93 on first main surface 3 different from first portion 82. In particular, controller 80 may control fourth motor 95 in such a manner that, while workpiece 2 is revolving, second nozzle 76 revolves in the same way as workpiece 2 in plan view of first main surface 3. For example, controller 80 may control fourth motor 95 in such a manner that, when workpiece 2 makes a circular motion around first portion 82 with a radius of $r_1$ in plan view of first main surface 3, second nozzle 76 also makes a circular motion around first portion 82 with a radius of $r_1$ in plan view of first main surface 3.

The second supply rate of second liquid 78 may be higher than the first supply rate of first liquid 73. For example, the second supply rate of second liquid 78 may be ten or more times, or twenty or more times higher than the first supply rate of first liquid 73.

The laser processing method in the present embodiment may include stopping the revolution of workpiece 2 and stopping the movement of second nozzle 76. Specifically, controller 80 stops fourth motor 95 to stop the movement of second nozzle 76. Controller 80 may stop the movement of second nozzle 76 at the same time as stopping the revolution of workpiece 2.

Laser processing apparatus 1$d$ in the present embodiment brings about the following advantageous effects in addition to the advantageous effects of laser processing apparatus 1$b$ in embodiment 2.

Laser processing apparatus 1d in the present embodiment further includes second nozzle 76 configured to supply second liquid 78 to the main surface (first main surface 3). The second supply rate of second liquid 78 may be higher than the first supply rate of first liquid 73. Second nozzle 76 is configured to be movable relative to holder 10 in such a manner that, while workpiece 2 is revolving, second liquid 78 can continue being supplied to the same spot 93 on the main surface (first main surface 3) different from first portion 82.

Since second liquid 78 continues being supplied to the same spot 93 on the main surface (first main surface 3) of workpiece 2 while workpiece 2 is revolving, the thickness distribution of liquid layer 79 can be maintained. Therefore, diffusion and attenuation of laser beam 62 due to liquid layer 79 can be reduced, and the main surface (first main surface 3) is prevented from being exposed through liquid layer 79. According to laser processing apparatus 1d in the present embodiment, workpiece 2 can be efficiently and stably processed, and the debris generated from workpiece 2 during laser processing of workpiece 2 can be reliably prevented from adhering to the main surface (first main surface 3) of workpiece 2.

The laser processing method in the present embodiment brings about the following advantageous effects in addition to the advantageous effects of the laser processing method in embodiment 2.

The laser processing method in the present embodiment further includes supplying second liquid 78 from second nozzle 76 to the main surface (first main surface 3) before irradiating first portion 82 with laser beam 62. The second supply rate of second liquid 78 may be higher than the first supply rate of first liquid 73. Second nozzle 76 moves in such a manner that, while workpiece 2 is revolving, second liquid 78 continues being supplied to the same spot 93 on the main surface (first main surface 3) different from first portion 82.

Since second liquid 78 continues being supplied to the same spot 93 on the main surface (first main surface 3) of workpiece 2 while workpiece 2 is revolving, the thickness distribution of liquid layer 79 can be maintained. Therefore, diffusion and attenuation of laser beam 62 due to liquid layer 79 can be reduced, and the main surface (first main surface 3) is prevented from being exposed through liquid layer 79. According to the laser processing method in the present embodiment, workpiece 2 can be efficiently and stably processed, and the debris generated from workpiece 2 during laser processing of workpiece 2 can be reliably prevented from adhering to the main surface (first main surface 3) of workpiece 2.

Embodiment 5

Figure 23:
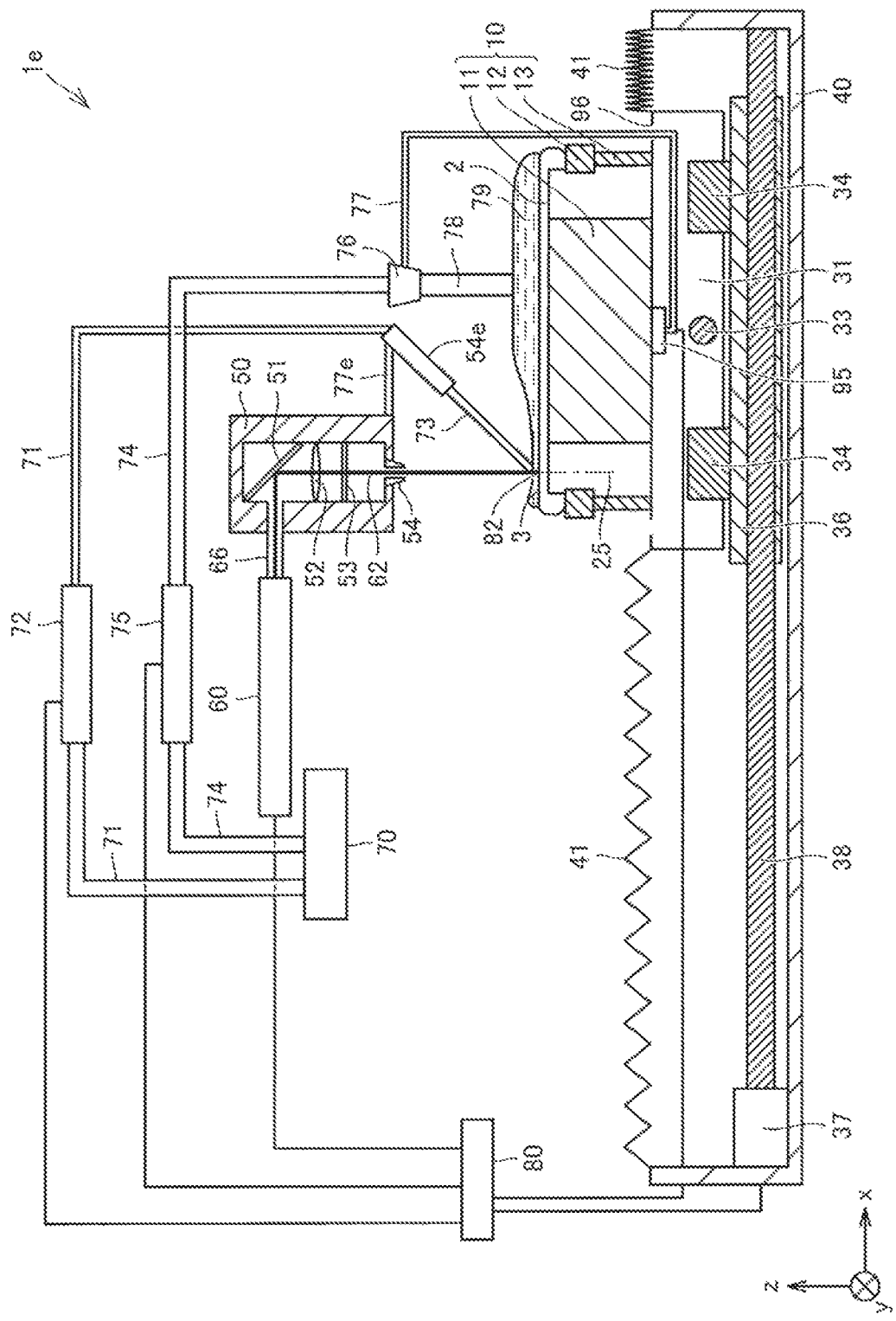
FIG. 23 is a schematic cross-sectional view of a laser processing apparatus in embodiment 5 of the present invention.

With reference to FIG. 23, a laser processing apparatus 1e in embodiment 5 is described. Laser processing apparatus 1e in the present embodiment is similar in configuration to laser processing apparatus 1d in embodiment 4, but is different mainly in the following respects.

Laser processing apparatus 1e is configured to supply first liquid 73 from a first nozzle 54e, instead of being configured to supply first liquid 73 from first nozzle 54 as in laser processing apparatus 1d. Specifically, laser processing apparatus 1e includes first nozzle 54e configured to supply first liquid 73 toward first portion 82. First liquid 73 is supplied not from first nozzle 54 but from first nozzle 54e. First nozzle 54 serves only as an emission hole of laser beam 62. First nozzle 54e may be attached to head 50 via a fourth arm 77e, but this is not a limitation. First nozzle 54e is connected to liquid reservoir 70. In particular, first nozzle 54e may be connected to liquid reservoir 70 via first pipe 71 and first pump 72. Head 50 is not connected to liquid reservoir 70. Laser beam 62 does not propagate through liquid column (73).

The laser processing method in the present embodiment includes steps similar to those of the laser processing method in embodiment 4, but is different mainly in the following respects. In the present embodiment, first liquid 73 is supplied not from first nozzle 54 but from first nozzle 54e. Laser beam 62 does not propagate through liquid column (73).

Laser processing apparatus 1e and the laser processing method in the present embodiment bring about the advantageous effects similar to those of laser processing apparatus 1d and the laser processing method in embodiment 4. In embodiments 1 to 3, 6, and 8, first liquid 73 may be supplied from first nozzle 54e, instead of being supplied from first nozzle 54.

Embodiment 6

Figure 24:
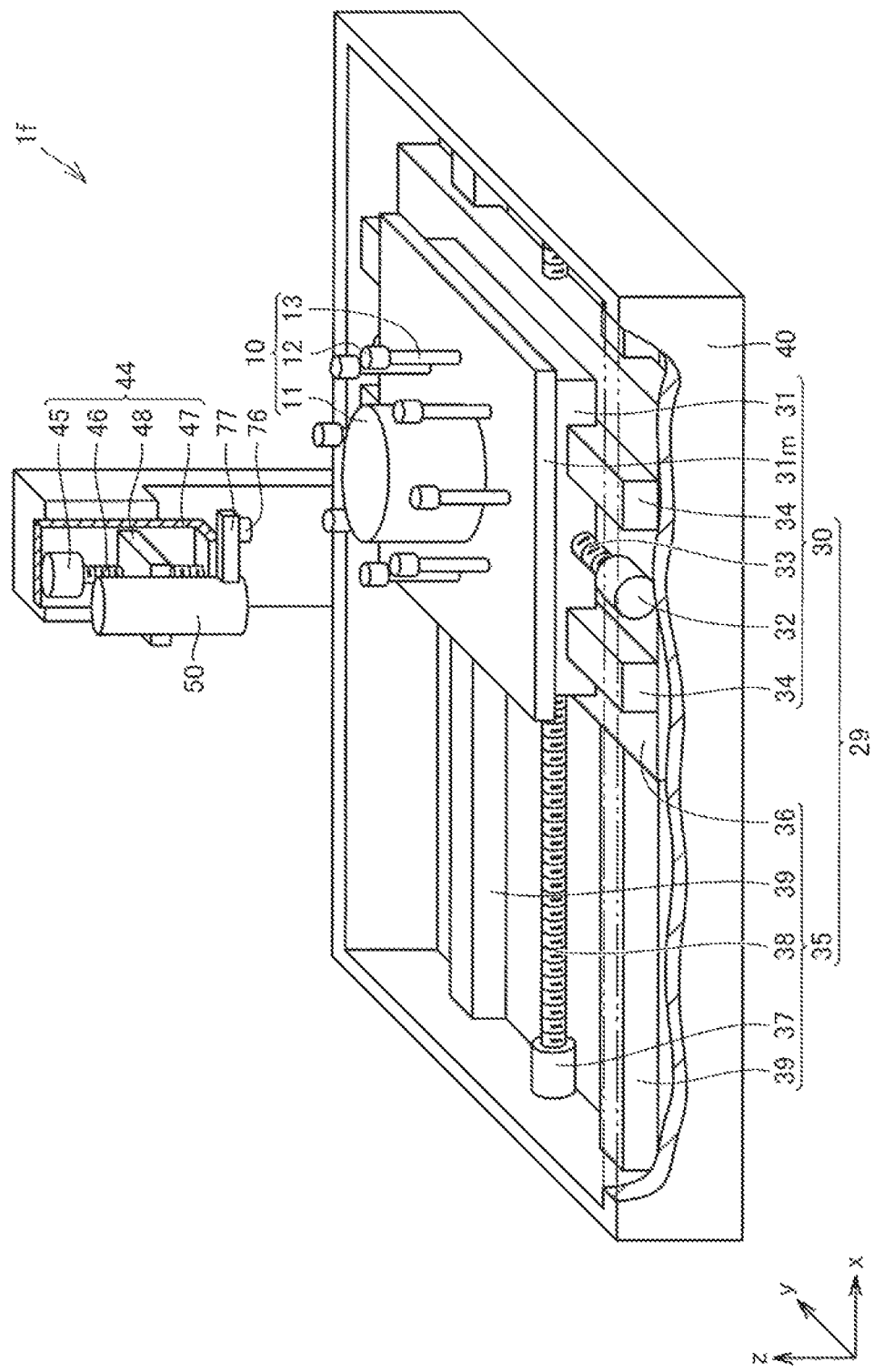
FIG. 24 is a schematic perspective view of a laser processing apparatus in embodiment 6 of the present invention.
Figure 25:
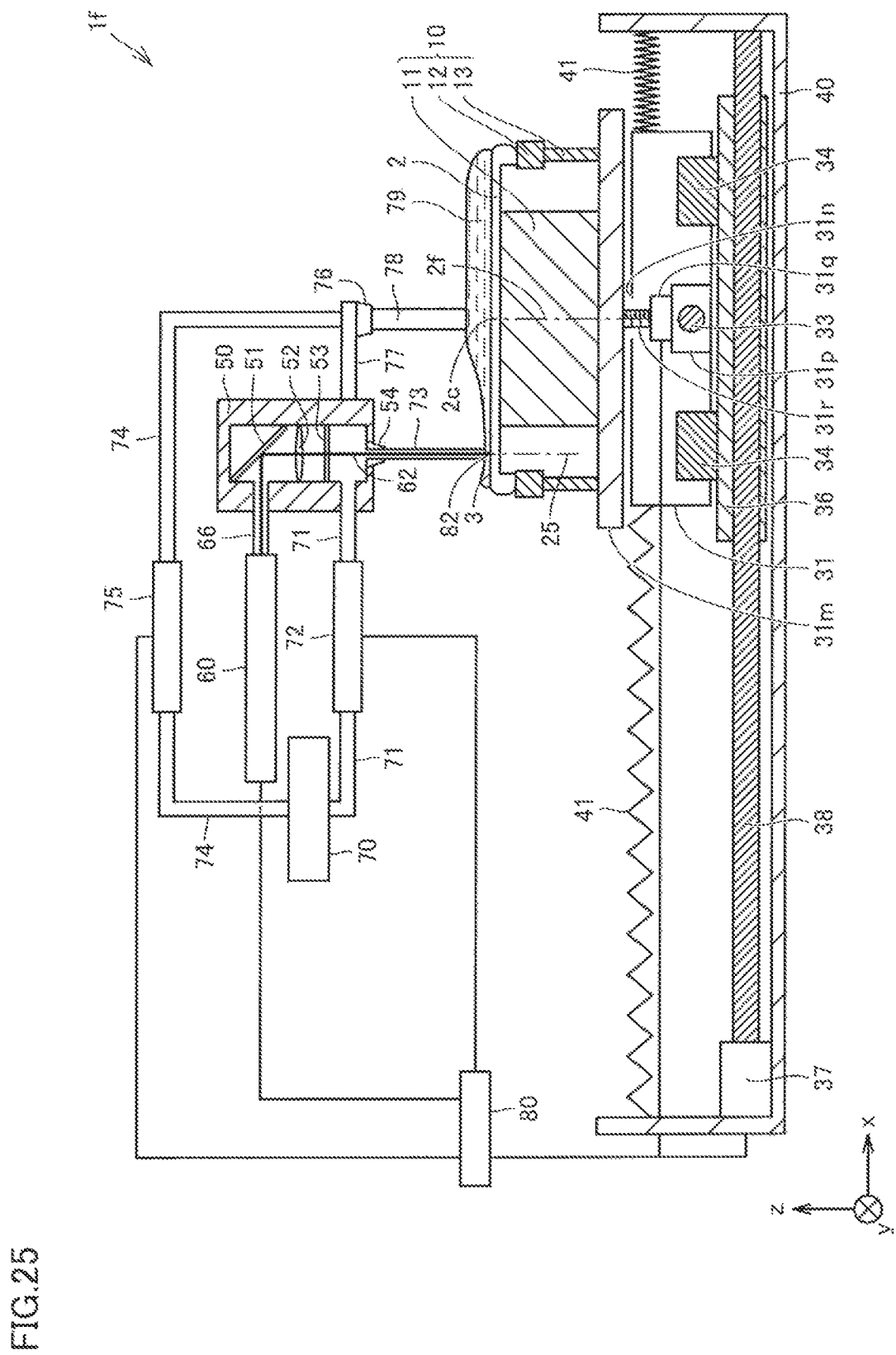
FIG. 25 is a schematic cross-sectional view of a laser processing apparatus in embodiment 6 of the present invention.
Figure 26:
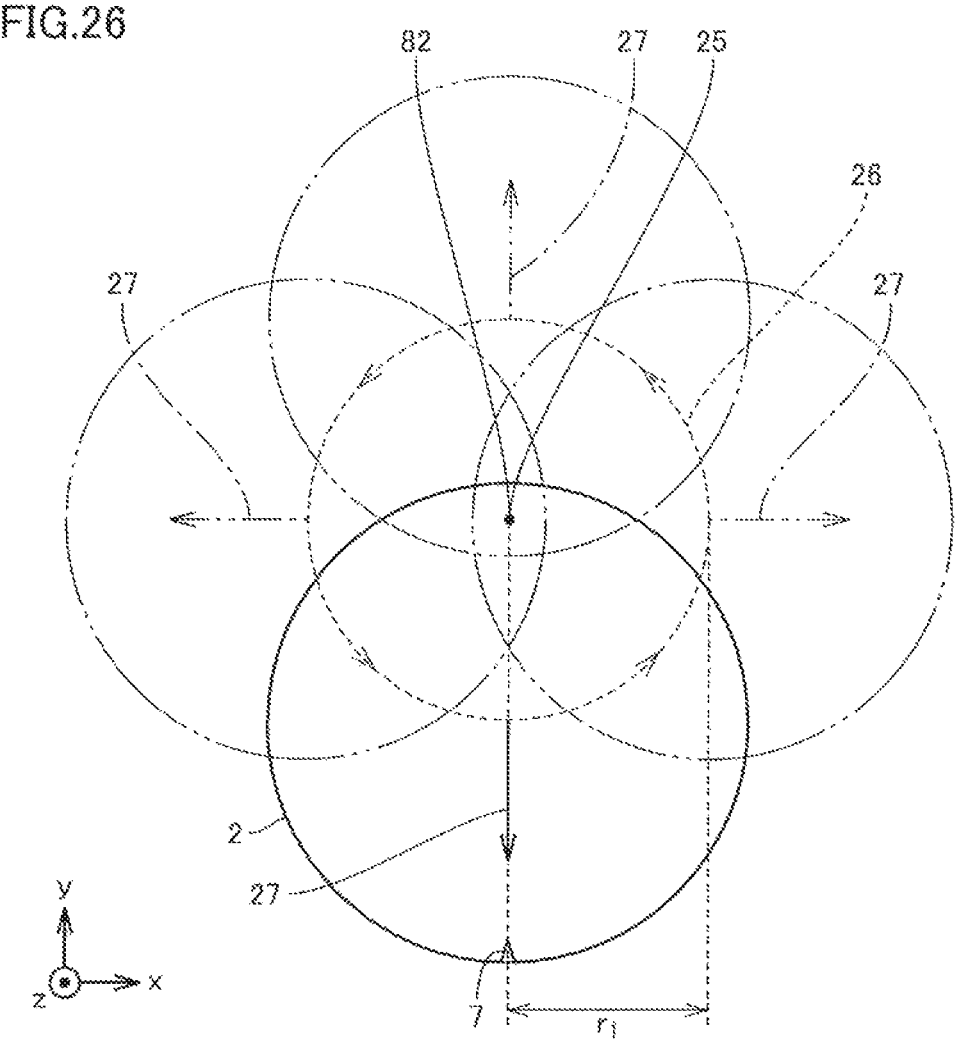
FIG. 26 is a plan view showing revolution and rotation of a workpiece in a laser processing apparatus in embodiment 6 of the present invention.

With reference to FIG. 24 to FIG. 26, a laser processing apparatus 1f in embodiment 6 is described. Laser processing apparatus 1f in the present embodiment is similar in configuration to laser processing apparatus 1b in embodiment 2, but is different mainly in the following respects.

In laser processing apparatus 1f in the present embodiment, driver 29 is configured to rotate workpiece 2 around the central axis 2f of workpiece 2 while workpiece 2 is revolving. Central axis 2f passes through the center 2c of first main surface 3 and is perpendicular to first main surface 3. The second angular velocity of the rotation of workpiece 2 is lower than the first angular velocity of the revolution of workpiece 2.

Specifically, driver 29 in the present embodiment is similar in configuration to driver 29 in embodiment 1, but further includes a case 31p, a fifth motor 31q, a third ball screw 31r, and a base plate 31m. First base 31 in the present embodiment is similar in configuration to first base 31 in embodiment 1, but is a hollow member. Case 31p is disposed in first base 31. Case 31p extends in the first direction (y direction). Case 31p contains a part of first ball screw 33.

Fifth motor 31q is disposed in first base 31. Fifth motor 31q is disposed on the external surface of case 31p. Fifth motor 31q is spaced apart from first ball screw 33 by case 31p. Fifth motor 31q is electrically connected to controller 80. One end of third ball screw 31r is rotatably connected to fifth motor 31q. Third ball screw 31r extends through a hole 31n of first base 31. The other end of third ball screw 31r is fixed to base plate 31m. Holder 10 is fixed to base plate 31m.

Fifth motor 31q rotates third ball screw 31r, thus rotating base plate 31m and holder 10. By first motor 32, second motor 37, and fifth motor 31q, workpiece 2 can revolve around optical axis 25 of laser beam 62 at first portion 82 while rotating around central axis 2f of workpiece 2 (while changing the orientation of workpiece 2). Central axis 2f passes through center 2c of first main surface 3 and is perpendicular to first main surface 3. The second angular velocity of the rotation of workpiece 2 is lower than the first angular velocity of the revolution of workpiece 2.

Controller 80 in the present embodiment is similar in configuration to controller 80 in embodiment 1, but is further connected to fifth motor 31q. Controller 80 is configured to control driver 29 to revolve workpiece 2 around optical axis 25 of laser beam 62 at first portion 82 while rotating workpiece 2 (while changing the orientation of workpiece 2). Specifically, controller 80 controls first motor 32, second motor 37, and fifth motor 31*q*. Controller 80 controls first motor 32 and second motor 37 to revolve holder 10 around optical axis 25 of laser beam 62 while controlling fifth motor 31*q* to rotate holder 10 around central axis 2*f* of workpiece 2.

Controller 80 may be configured to control driver 29 (first motor 32, second motor 37, and fifth motor 31*q*) in such a manner that the second angular velocity of the rotation of workpiece 2 is lower than the first angular velocity of the revolution of workpiece 2. Accordingly, while workpiece 2 is revolving, the thickness of liquid layer 79 can stably continue to be smallest at first portion 82. The second angular velocity of the rotation of workpiece 2 may be, for example, ½ or less of the first angular velocity of the revolution of workpiece 2, ⅓ or less of the angular velocity of the revolution of workpiece 2, ¼ or less of the angular velocity of the revolution of workpiece 2, ⅙ or less of the angular velocity of the revolution of workpiece 2, or ⅛ or less of the angular velocity of the revolution of workpiece 2.

In particular, controller 80 may be configured to control driver 29 (first motor 32, second motor 37, and fifth motor 31*q*) in such a manner that the sum of the first rotational angle of the revolution of workpiece 2 and the second rotational angle of the rotation of workpiece 2 is an integral multiple of 360°. For example, as shown in FIG. 26, the first rotational angle of the revolution of workpiece 2 may be 270°, and the second rotational angle of the rotation of workpiece 2 may be 90°. Accordingly, the processing end position of workpiece 2 can coincide with the processing start position of workpiece 2.

Figure 27:
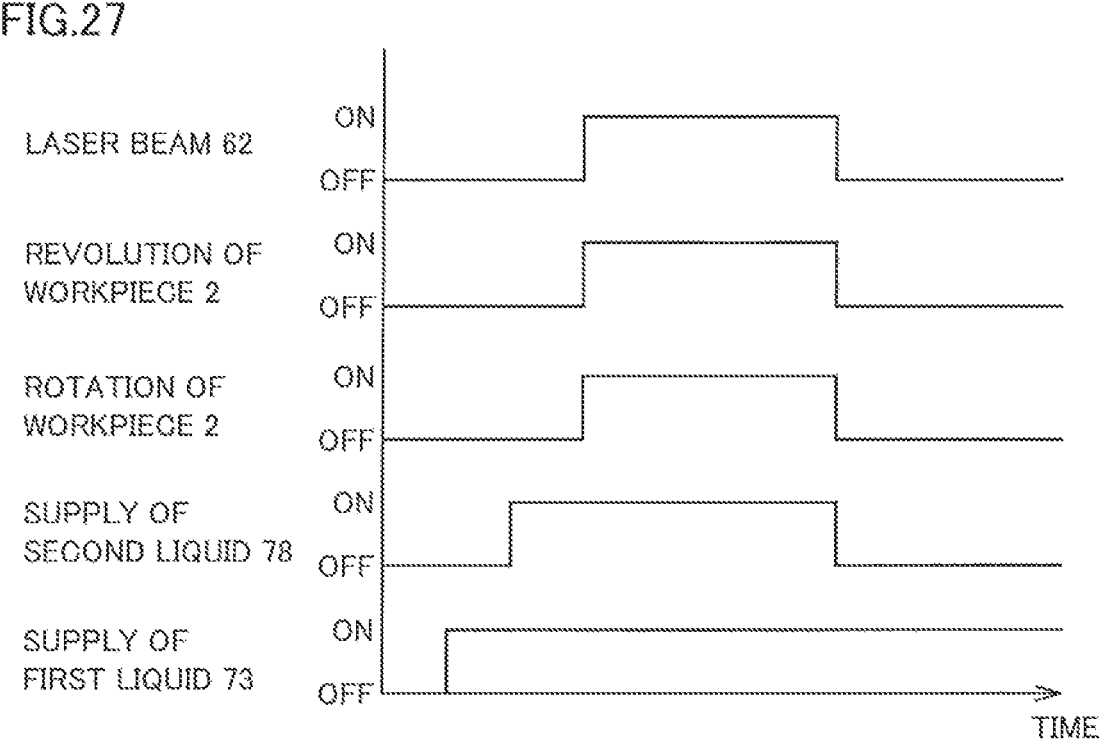
FIG. 27 shows a timing chart of a laser processing method in embodiment 6 of the present invention.

With reference to FIG. 27, a laser processing method using laser processing apparatus 1f in the present embodiment is described. The laser processing method in the present embodiment includes steps similar to those of the laser processing method in embodiment 2, but is different in the following respects. In the laser processing method in the present embodiment, workpiece 2 is rotating around central axis 2*f* of workpiece 2 while revolving around optical axis 25 of laser beam 62 at first portion 82.

Specifically, after starting to supply first liquid 73 and second liquid 78 to first main surface 3 of workpiece 2, controller 80 may control first motor 32 and second motor 37 to revolve workpiece 2 (holder 10) around optical axis 25 of laser beam 62 at first portion 82 while controlling fifth motor 31*q* to rotate workpiece 2 (holder 10) around central axis 2*f* of workpiece 2 (while changing the orientation of workpiece 2). Alternatively, at the same time as starting to supply first liquid 73 and second liquid 78 to first main surface 3 of workpiece 2, controller 80 may control first motor 32 and second motor 37 to revolve workpiece 2 (holder 10) around optical axis 25 of laser beam 62 at first portion 82 while controlling fifth motor 31*q* to rotate workpiece 2 (holder 10) around central axis 2*f* of workpiece 2 (while changing the orientation of workpiece 2).

While first portion 82 is being irradiated with laser beam 62, controller 80 continues revolving workpiece 2 (holder 10) around optical axis 25 of laser beam 62 at first portion 82 while rotating workpiece 2 (holder 10) around central axis 2*f* of workpiece 2 (while changing the orientation of workpiece 2). While first portion 82 is being irradiated with laser beam 62, the thickness of liquid layer 79 is smallest at first portion 82 and increases with distance from first portion 82. Therefore, diffusion and attenuation of laser beam 62 due to liquid layer 79 can be reduced. Also, first main surface 3 of workpiece 2 is prevented from being exposed through liquid layer 79. Liquid layer 79 immediately cools and washes away the debris generated by processing workpiece 2 with laser beam 62.

The revolution and the rotation of workpiece 2 (holder 10) may be stopped after or at the same time as the irradiation of workpiece 2 with laser beam 62 is stopped. Specifically, controller 80 stops first motor 32, second motor 37, and fifth motor 31*q* to stop the revolution and the rotation of workpiece 2 (holder 10). In particular, as shown in FIG. 26, the revolution and the rotation of workpiece 2 (holder 10) may be stopped when the sum of the first rotational angle of the revolution of workpiece 2 and the second rotational angle of the rotation of workpiece 2 is an integral multiple of 360°.

Laser processing apparatus 1f in the present embodiment brings about the advantageous effects similar to those of laser processing apparatus 1b in embodiment 2. The laser processing method in the present embodiment brings about the advantageous effects similar to those of the laser processing method in embodiment 2. In embodiments 1 and 3 to 7, workpiece 2 may rotate around central axis 2*f* of workpiece 2 while revolving.

Embodiment 7

Figure 28:
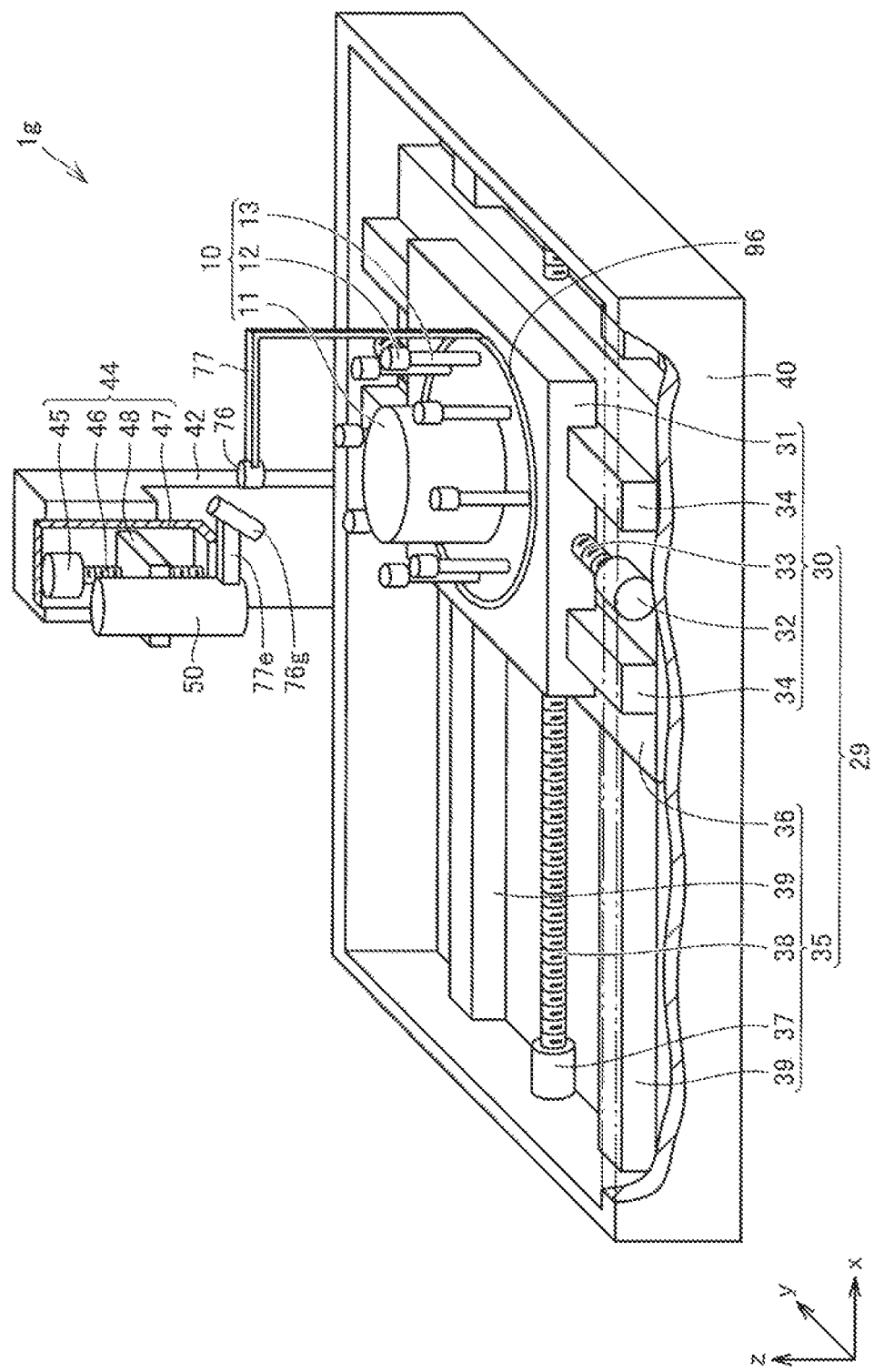
FIG. 28 is a schematic perspective view of a laser processing apparatus in embodiment 7 of the present invention.
Figure 29:
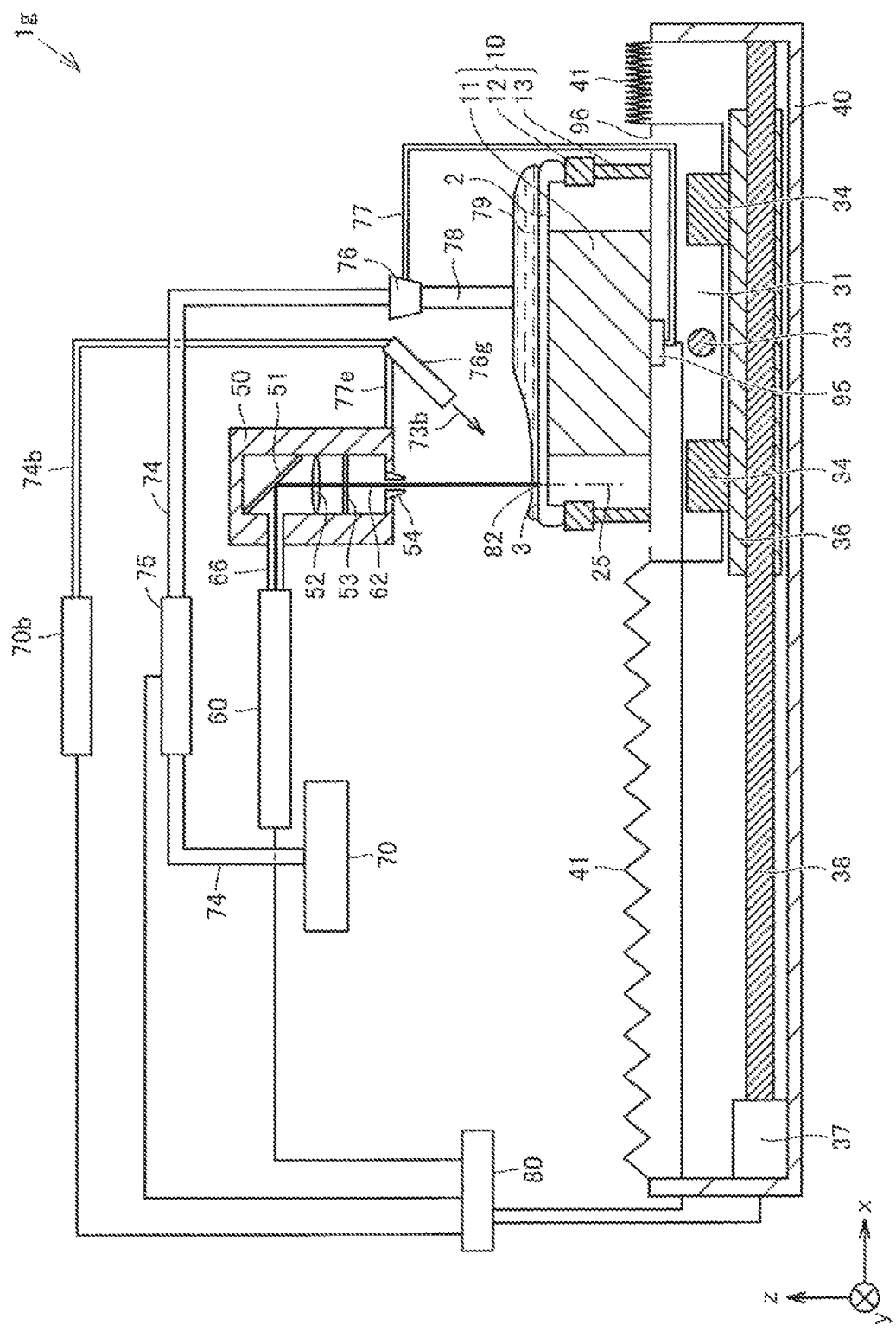
FIG. 29 is a schematic cross-sectional view of a laser processing apparatus in embodiment 7 of the present invention.

With reference to FIG. 28 and FIG. 29, a laser processing apparatus 1*g* in embodiment 7 is described. Laser processing apparatus 1*g* in the present embodiment is similar in configuration to laser processing apparatus 1*e* in embodiment 5, but is different mainly in the following respects. Laser processing apparatus 1*g* in the present embodiment is configured to supply gas 73*b* from a gas nozzle 76*g* to first main surface 3 of workpiece 2, instead of being configured to supply first liquid 73 from first nozzle 54 to first main surface 3 of workpiece 2 as in laser processing apparatus 1*e* in embodiment 5.

Specifically, laser processing apparatus 1*g* in the present embodiment includes gas nozzle 76*g*, a gas supply portion 70*b*, and a gas pipe 74*b*, instead of first nozzle 54*e*, first pipe 71, and first pump 72 in laser processing apparatus 1*e* in embodiment 5. Gas nozzle 76*g* is in fluid communication with gas supply portion 70*b* via gas pipe 74*b*. Gas supply portion 70*b* is electrically connected to controller 80. Controller 80 is configured to control gas supply portion 70*b* to supply gas 73*b* from gas supply portion 70*b* through gas pipe 74*b* to gas nozzle 76*g*. Gas supply portion 70*b* may include a gas pump (not shown) configured to send gas 73*b* toward gas nozzle 76*g*.

Gas nozzle 76*g* is configured to blow gas 73*b* onto first portion 82. Gas 73*b* is blown onto liquid layer 79 formed by second liquid 78, and thus the thickness of liquid layer 79 is smallest at first portion 82 and increases with distance from first portion 82. Therefore, diffusion and attenuation of laser beam 62 due to liquid layer 79 can be reduced. First main surface 3 of workpiece 2 is prevented from being exposed through liquid layer 79. Liquid layer 79 immediately cools and washes away the debris generated by processing workpiece 2 with laser beam 62.

Controller 80 is configured to control gas supply portion 70*b* to continue blowing gas 73*b* onto first portion 82 while first portion 82 is being irradiated with laser beam 62. Controller 80 is configured to control gas supply portion 70*b* to continue blowing gas 73*b* onto first portion 82 before or at the same time as starting the irradiation of workpiece 2 with laser beam 62. Controller 80 may be configured to control gas supply portion 70*b* to blow gas 73*b* onto first portion 82 while workpiece 2 (holder 10) is revolving.

Figure 30:
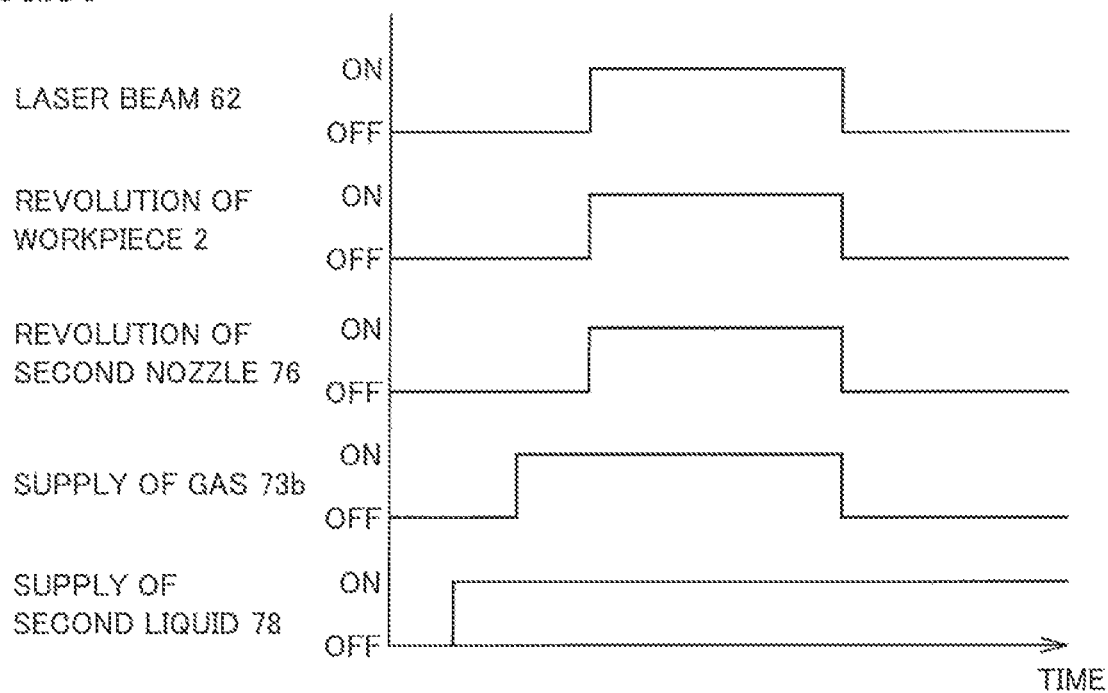
FIG. 30 shows a timing chart of a laser processing method in embodiment 7 of the present invention.

With reference to FIG. 30, a laser processing method using laser processing apparatus 1g in the present embodiment is described. The laser processing method using laser processing apparatus 1g in the present embodiment includes steps similar to those of the laser processing method using laser processing apparatus 1e in embodiment 5, but is different in the following respects.

The laser processing method in the present embodiment includes blowing gas 73b from gas nozzle 76g onto first portion 82 of workpiece 2, instead of supplying first liquid 73 from first nozzle 54 to first portion 82 of workpiece 2 as in the laser processing method in embodiment 5. While first portion 82 is being irradiated with laser beam 62, gas 73b continues being blown from gas nozzle 76g onto first portion 82 of workpiece 2. The blow of gas 73b onto first portion 82 may be performed after second liquid 78 starts to be supplied to the second portion of first main surface 3 of workpiece 2. The blow of gas 73b onto first portion 82 may be performed before or at the same time as second liquid 78 starts to be supplied to the second portion of first main surface 3 of workpiece 2.

After or at the same time as the irradiation of workpiece 2 with laser beam 62 is stopped, the revolution of workpiece 2 (holder 10) and the blow of gas 73b may be stopped. Specifically, controller 80 may stop first motor 32 and second motor 37 to stop the revolution of workpiece 2 (holder 10), and may stop the operation of gas supply portion 70b to stop the blow of gas 73b.

Laser processing apparatus 1g in the present embodiment brings about the following advantageous effects similar to those of laser processing apparatus 1e in embodiment 5.

Laser processing apparatus 1g in the present embodiment includes holder 10, head 50, gas nozzle 76g, second nozzle 76, and driver 29. Holder 10 is configured to hold workpiece 2. Head 50 is configured to irradiate first portion 82 of the main surface (first main surface 3) of workpiece 2 with laser beam 62. Gas nozzle 76g is configured to blow gas 73b onto first portion 82. Second nozzle 76 is configured to supply second liquid 78 to the second portion of the main surface different from first portion 82. Driver 29 is configured to drive holder 10 in such a manner that workpiece 2 can revolve around optical axis 25 of laser beam 62 at first portion 82.

The laser processing method in the present embodiment includes blowing gas 73b onto first portion 82 of the main surface (first main surface 3) of workpiece 2, supplying second liquid 78 from second nozzle 76 to the second portion of the main surface different from first portion 82, and irradiating first portion 82 with laser beam 62 while revolving workpiece 2 around optical axis 25 of laser beam 62 at first portion 82.

In laser processing apparatus 1g in the present embodiment and the laser processing method in the present embodiment, gas 73b continues being blown from gas nozzle 76g onto first portion 82 of workpiece 2 while first portion 82 is being irradiated with laser beam 62. While first portion 82 is being irradiated with laser beam 62, the thickness of liquid layer 79 is smallest at first portion 82 and increases with distance from first portion 82. Therefore, diffusion and attenuation of laser beam 62 due to liquid layer 79 can be reduced. Also, first main surface 3 of workpiece 2 is prevented from being exposed through liquid layer 79. Liquid layer 79 immediately cools and washes away the debris generated by processing workpiece 2 with laser beam 62. According to laser processing apparatus 1g in the present embodiment and the laser processing method in the present embodiment, workpiece 2 can be efficiently processed, and the debris generated from workpiece 2 during laser processing of workpiece 2 can be prevented from adhering to the main surface (first main surface 3) of workpiece 2. In embodiments 1 to 4, 6, and 8, gas 73b may be supplied from gas nozzle 76g to first main surface 3 of workpiece 2, instead of supplying first liquid 73 from first nozzle 54 to first main surface 3 of workpiece 2.

Embodiment 8

Figure 31:
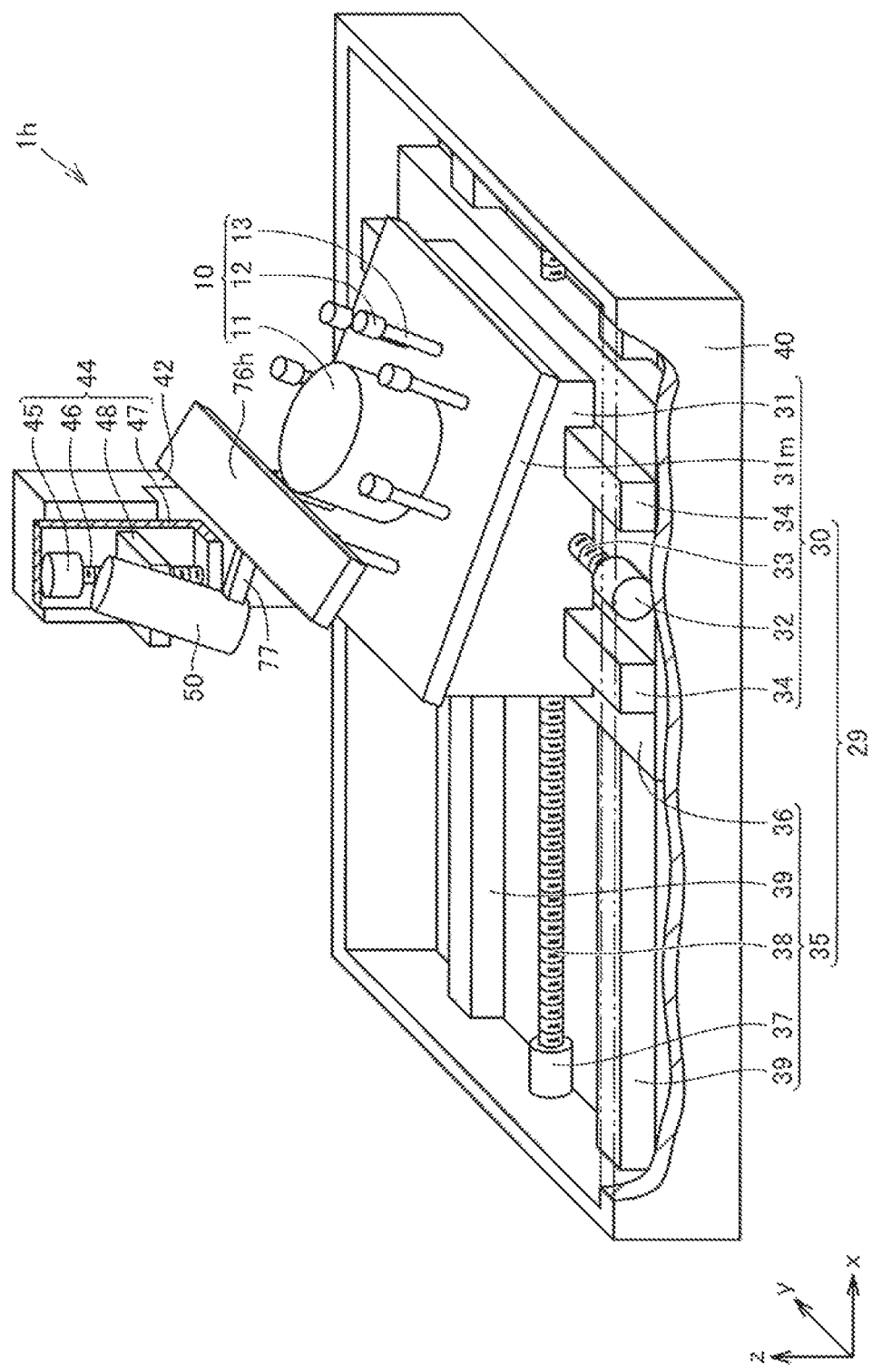
FIG. 31 is a schematic perspective view of a laser processing apparatus in embodiment 8 of the present invention.
Figure 32:
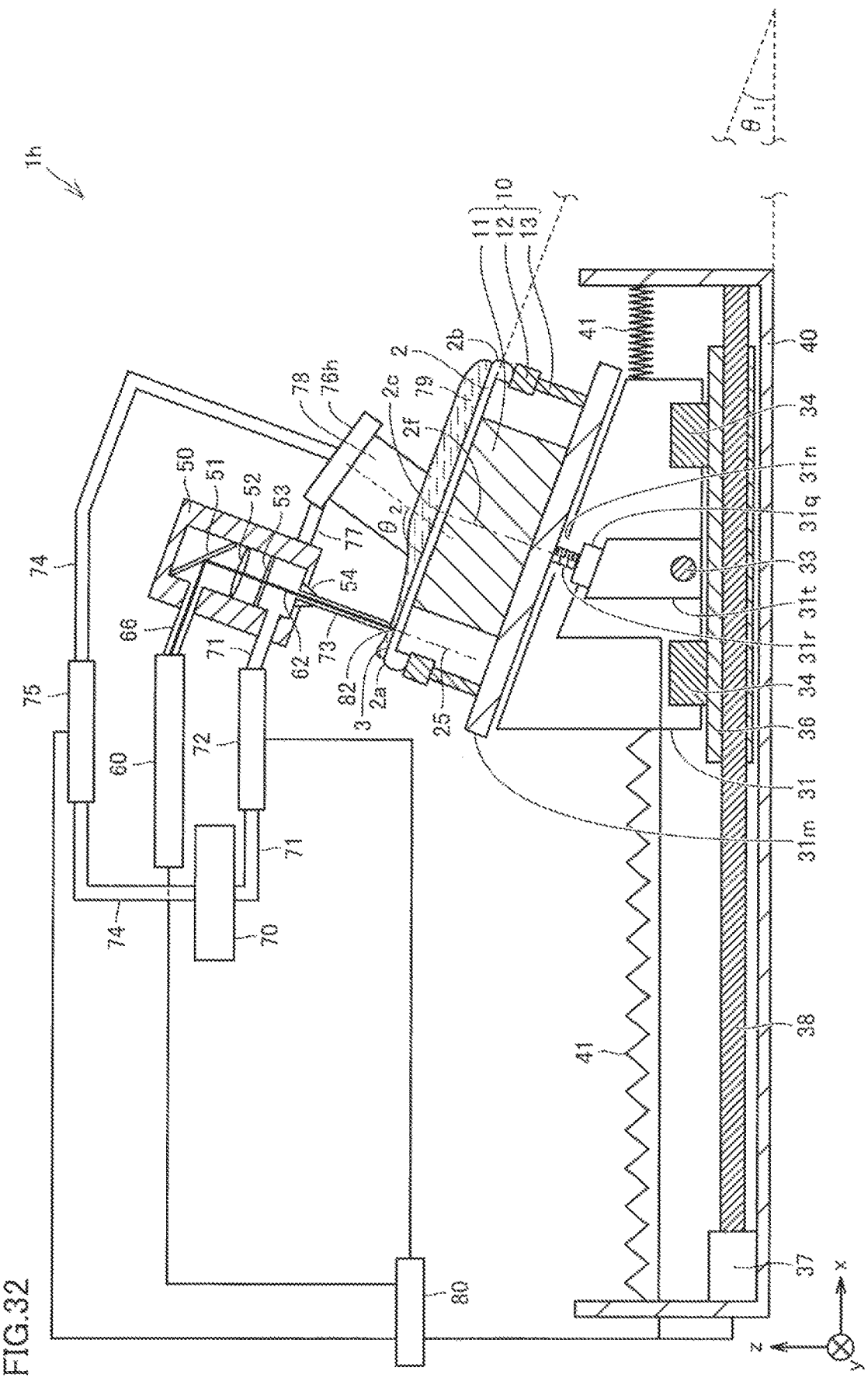
FIG. 32 is a schematic cross-sectional view of a laser processing apparatus in embodiment 8 of the present invention.
Figure 33:
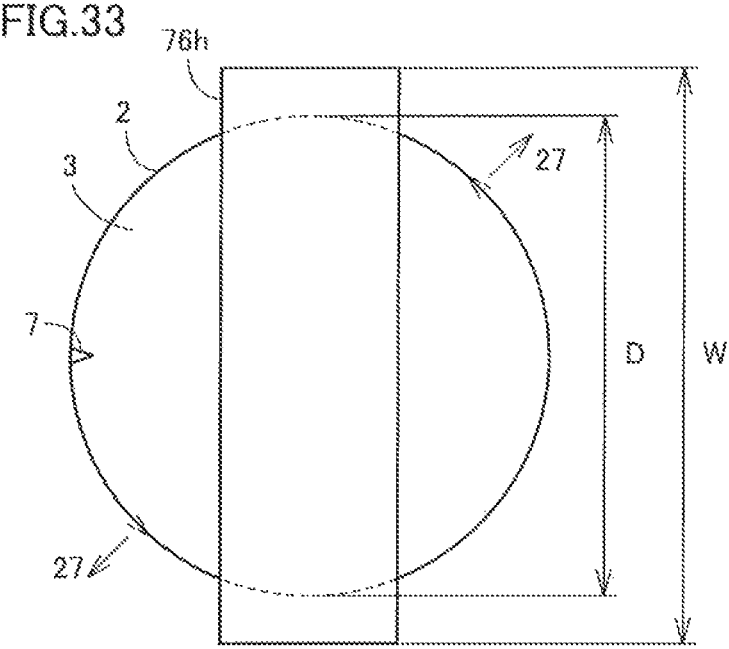
FIG. 33 is a partial enlarged plan view of a laser processing apparatus in embodiment 8 of the present invention.

With reference to FIG. 31 to FIG. 33, a laser processing apparatus 1h in embodiment 8 is described. Laser processing apparatus 1h in the present embodiment is similar in configuration to laser processing apparatus 1f in embodiment 6, but is different mainly in the following respects.

In laser processing apparatus 1h, holder 10 is configured to hold workpiece 2 in such a manner that first main surface 3 of workpiece 2 is inclined relative to a horizontal plane (x-y plane). First portion 82 is at a position higher than the second portion and center 2c of first main surface 3. The second portion to which second liquid 78 is supplied may be at a position higher than center 2c of first main surface 3. Inclination angle $\theta_1$ of first main surface 3 relative to a horizontal plane (x-y plane) may be, but is not limited to, 45° or less, 30° or less, 15° or less, or 10° or less. Inclination angle $\theta_1$ of first main surface 3 relative to a horizontal plane (x-y plane) may be, but is not limited to, 1° or more, 3° or more, or 5° or more.

Laser processing apparatus 1h in the present embodiment includes a second nozzle 76h, instead of second nozzle 76 in embodiment 6. Second nozzle 76h is configured to supply second liquid 78 to the second portion of first main surface 3 different from first portion 82. The second supply rate of second liquid 78 may be higher than the first supply rate of first liquid 73. As shown in FIG. 33, second nozzle 76h has width W greater than or equal to the maximum length of workpiece 2 in plan view of first main surface 3. If first main surface 3 of workpiece 2 has a circular shape, the maximum length of workpiece 2 in plan view of first main surface 3 is diameter D of first main surface 3.

First main surface 3 of workpiece 2 is inclined relative to a horizontal plane (x-y plane). Due to the gravity exerting on first liquid 73, first liquid 73 supplied to first portion 82 runs down first main surface 3 without spreading over first main surface 3. However, second nozzle 76h has width W greater than or equal to the maximum length of workpiece 2 in plan view of first main surface 3. Accordingly, with first main surface 3 of workpiece 2 being inclined relative to a horizontal plane (x-y plane), the most part of first main surface 3 can still be prevented from being exposed through liquid layer 79 formed by first liquid 73 and second liquid 78, and liquid layer 79 can cool and wash away the debris generated by processing workpiece 2 with laser beam 62.

Angle $\theta_2$ between a third direction from center 2c of first main surface 3 to first portion 82, and a fourth direction in which second liquid 78 is jetted from second nozzle 76h to first main surface 3 may be 90° or more, or 100° or more. Accordingly, a part of second liquid 78 can flow from the second portion to first portion 82 against the gravity. The thickness of liquid layer 79 can be reduced gradually from center 2c toward first portion 82. The most part of first main surface 3 can be prevented from being exposed through liquid layer 79 formed by first liquid 73 and second liquid 78, and liquid layer 79 can cool and wash away the debris generated by processing workpiece 2 with laser beam 62. Second inclination angle $\theta_2$ may be, but is not limited to, 135° or less, or 120° or less.

Driver 29 is configured to drive holder 10 in such a manner that workpiece 2 can rotate around central axis 2f of workpiece 2. Specifically, controller 80 is configured to control driver 29 (fifth motor 31q) to rotate workpiece 2 around central axis 2f of workpiece 2. While first portion 82 is being irradiated with laser beam 62, workpiece 2 rotates around central axis 2f of workpiece 2. The rotation of workpiece 2 exerts centrifugal force 27 on liquid layer 79 on first main surface 3. Due to this centrifugal force 27, the thickness of liquid layer 79 formed by first liquid 73 and second liquid 78 can gradually be reduced from center 2c of first main surface 3 toward first portion 82.

In laser processing apparatus 1h in the present embodiment, first nozzle 54 may be provided on head 50, as in laser processing apparatus 1f in embodiment 6. Laser beam 62 may be emitted from first nozzle 54. Laser beam 62 may propagate through liquid column (73) formed by first liquid 73 between first nozzle 54 and first portion 82.

Figure 34:
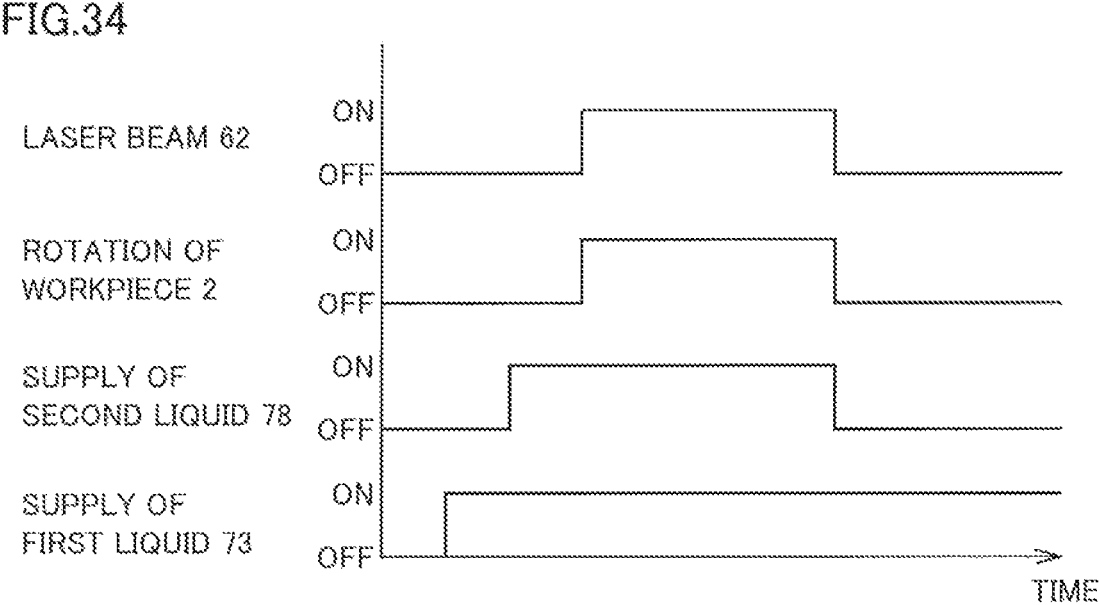
FIG. 34 shows a timing chart of a laser processing method in embodiment 8 of the present invention.

With reference to FIG. 34, a laser processing method using laser processing apparatus 1h in the present embodiment is described. The laser processing method using laser processing apparatus 1h in the present embodiment includes steps similar to those of the laser processing method using laser processing apparatus 1f in embodiment 6, but is different in the following respects.

The laser processing method in the present embodiment includes supplying first liquid 73 from first nozzle 54 to first portion 82 of the main surface (first main surface 3) of workpiece 2 inclined relative to a horizontal plane (x-y plane), and supplying second liquid 78 from second nozzle 76h to the second portion of the main surface (first main surface 3) different from first portion 82. Second nozzle 76h has width W greater than or equal to the maximum length of workpiece 2 in plan view of first main surface 3. The second supply rate of second liquid 78 may be higher than the first supply rate of first liquid 73.

The laser processing method in the present embodiment further includes irradiating first portion 82 with laser beam 62 while rotating workpiece 2 around central axis 2f of workpiece 2. First portion 82 is at a position higher than the second portion and center 2c. Specifically, controller 80 may control fifth motor 31q to rotate workpiece 2 (holder 10) around central axis 2f of workpiece 2 after starting to supply first liquid 73 and second liquid 78 to first main surface 3 of workpiece 2. Alternatively, controller 80 may control fifth motor 31q to rotate workpiece 2 (holder 10) around central axis 2f of workpiece 2 at the same time as starting to supply first liquid 73 and second liquid 78 to first main surface 3 of workpiece 2.

While first portion 82 is being irradiated with laser beam 62, controller 80 continues rotating workpiece 2 (holder 10) around central axis 2f of workpiece 2, and continues supplying first liquid 73 and second liquid 78 to first main surface 3 of workpiece 2. The rotation of workpiece 2 exerts centrifugal force 27 on liquid layer 79 on first main surface 3. While first portion 82 is being irradiated with laser beam 62, due to this centrifugal force 27, the thickness of liquid layer 79 formed by first liquid 73 and second liquid 78 can be gradually reduced from center 2c toward first portion 82. Therefore, diffusion and attenuation of laser beam 62 due to liquid layer 79 can be reduced. Since second nozzle 76h has width W greater than or equal to the maximum length of workpiece 2 in plan view of first main surface 3, first main surface 3 of workpiece 2 is prevented from being exposed through liquid layer 79. Liquid layer 79 immediately cools and washes away the debris generated by processing workpiece 2 with laser beam 62.

While first portion 82 is being irradiated with laser beam 62, controller 80 may or may not revolve workpiece 2 around optical axis 25. After or at the same time as the irradiation of workpiece 2 with laser beam 62 is stopped, the rotation of workpiece 2 (holder 10) may be stopped. Specifically, controller 80 stops fifth motor 31q to stop the rotation of workpiece 2 (holder 10).

In the laser processing method in the present embodiment, laser beam 62 may be emitted from first nozzle 54, as in the laser processing method in embodiment 6. Laser beam 62 may propagate through liquid column (73) formed by first liquid 73 between first nozzle 54 and first portion 82.

Laser processing apparatus 1h in the present embodiment and the laser processing method in the present embodiment bring about the following advantageous effects similar to those of laser processing apparatus 1f in embodiment 6 and the laser processing method in embodiment 6.

Laser processing apparatus 1h in the present embodiment includes holder 10, head 50, first nozzle 54, second nozzle 76h, and driver 29. Holder 10 is configured to hold workpiece 2 in such a manner that the main surface (first main surface 3) of workpiece 2 is inclined relative to a horizontal plane (x-y plane). Head 50 is configured to irradiate first portion 82 of the main surface (first main surface 3) with laser beam 62. First nozzle 54 is configured to supply first liquid 73 to first portion 82. Second nozzle 76h is configured to supply second liquid 78 to the second portion of the main surface (first main surface 3) different from first portion 82. Second nozzle 76h has width W greater than or equal to the maximum length of workpiece 2 in plan view of the main surface (first main surface 3). Driver 29 is configured to drive holder 10 in such a manner that workpiece 2 can rotate around central axis 2f of workpiece 2. Central axis 2f passes through center 2c of the main surface (first main surface 3) and is perpendicular to the main surface (first main surface 3). First portion 82 is at a position higher than the second portion and center 2c.

The laser processing method in the present embodiment includes supplying first liquid 73 from first nozzle 54 to first portion 82 of the main surface (first main surface 3) of workpiece 2 inclined relative to a horizontal plane (x-y plane), and supplying second liquid 78 from second nozzle 76h to the second portion of the main surface (first main surface 3) different from first portion 82. Second nozzle 76h has width W greater than or equal to the maximum length of workpiece 2 in plan view of the main surface (first main surface 3). The laser processing method in the present embodiment further includes irradiating first portion 82 with laser beam 62 while rotating workpiece 2 around central axis 2f of workpiece 2. Central axis 2f passes through center 2c of the main surface (first main surface 3) and is perpendicular to the main surface (first main surface 3). First portion 82 is at a position higher than the second portion and center 2c.

In laser processing apparatus 1h in the present embodiment and the laser processing method in the present embodiment, while first portion 82 is being irradiated with laser beam 62, controller 80 continues rotating workpiece 2 (holder 10) around central axis 2f of workpiece 2, and continues supplying first liquid 73 and second liquid 78 to first main surface 3 of workpiece 2. The rotation of workpiece 2 exerts centrifugal force 27 on liquid layer 79 on first main surface 3. While first portion 82 is being irradiated with laser beam 62, due to this centrifugal force 27, the thickness of liquid layer 79 can be gradually reduced from center 2c of first main surface 3 toward first portion 82.

Therefore, diffusion and attenuation of laser beam 62 due to liquid layer 79 can be reduced. Since second nozzle 76h has width W greater than or equal to the maximum length of workpiece 2 in plan view of first main surface 3, first main surface 3 of workpiece 2 is prevented from being exposed through liquid layer 79. Liquid layer 79 immediately cools and washes away the debris generated by processing workpiece 2 with laser beam 62. According to laser processing apparatus 1h in the present embodiment and the laser processing method in the present embodiment, workpiece 2 can be efficiently processed, and the debris generated from workpiece 2 during laser processing of workpiece 2 can be prevented from adhering to the main surface (first main surface 3) of workpiece 2. In embodiments 1 to 5 and 7, workpiece 2 may rotate around central axis 2f of workpiece 2, instead of revolving around optical axis 25 of laser beam 62.

Embodiment 9

Figure 3:
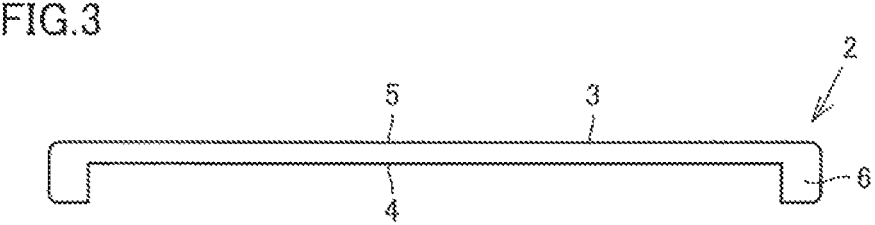
FIG. 3 is a schematic side view of a workpiece to be processed using a laser processing apparatus in embodiment 1 of the present invention.
Figure 35:
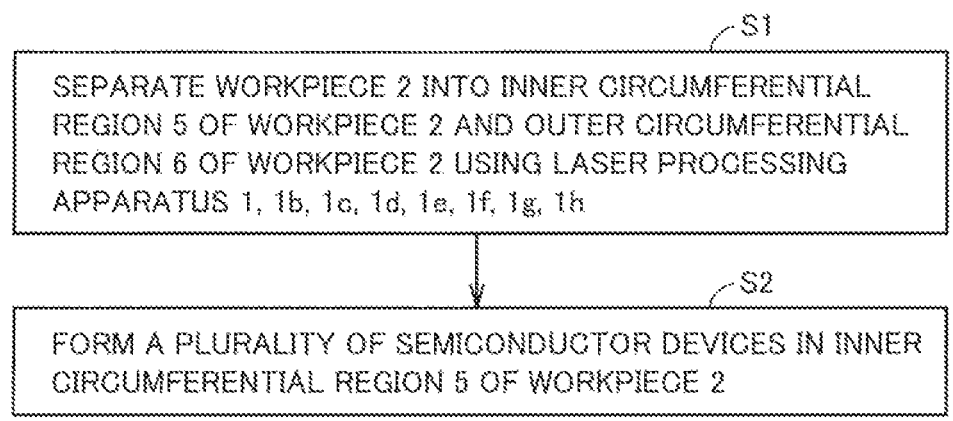
FIG. 35 shows a flowchart of a method for manufacturing a semiconductor apparatus in embodiment 9 of the present invention.

With reference to FIG. 3 and FIG. 35, a method for manufacturing a semiconductor apparatus in embodiment 9 is described.

The method for manufacturing a semiconductor apparatus in the present embodiment includes separating (S1) workpiece 2 into inner circumferential region 5 of workpiece 2 and outer circumferential region 6 of workpiece 2 using a laser processing apparatus in any one of embodiments 1 to 8 or a laser processing method in any one of embodiments 1 to 8, and forming (S2) a plurality of semiconductor devices in inner circumferential region 5 of workpiece 2. The plurality of semiconductor devices may be, for example, insulated-gate bipolar transistors (IGBTs) or metal-oxide-semiconductor field-effect transistors (MOSFETs).

A plurality of semiconductor devices may be formed (S2) in inner circumferential region 5 of workpiece 2 before separating (S1) workpiece 2 into inner circumferential region 5 of workpiece 2 and outer circumferential region 6 of workpiece 2. A plurality of semiconductor devices may be formed (S2) in inner circumferential region 5 of workpiece 2 after separating (S1) workpiece 2 into inner circumferential region 5 of workpiece 2 and outer circumferential region 6 of workpiece 2. A part of a plurality of semiconductor devices may be formed (S2) in inner circumferential region 5 of workpiece 2 before separating (S1) workpiece 2 into inner circumferential region 5 of workpiece 2 and outer circumferential region 6 of workpiece 2, and the remaining part of a plurality of semiconductor devices may be formed (S2) in inner circumferential region 5 of workpiece 2 after separating (S1) workpiece 2 into inner circumferential region 5 of workpiece 2 and outer circumferential region 6 of workpiece 2.

The method for manufacturing a semiconductor apparatus in the present embodiment brings about the advantageous effects similar to those of laser processing apparatuses 1, 1b, 1c, 1d, 1e, 1f, 1g, 1h and the laser processing methods in embodiments 1 to 8.

It should be understood that embodiments 1 to 9 disclosed herein are illustrative in every respect, not limitative. At least two of embodiments 1 to 9 disclosed herein may be combined if compatible. The scope of the present invention is defined not by the above description but by the terms of the claims, and is intended to include any modification within the meaning and scope equivalent to the terms of the claims.

REFERENCE SIGNS LIST 1, 1b, 1c, 1d, 1e, 1f, 1g, 1h: laser processing apparatus; 2: workpiece; 2c: center; 2f: central axis; 3: first main surface; 4: second main surface; 5: inner circumferential region; 6: outer circumferential region; 7: notch; 10: holder; 11: first holding sub-portion; 12: second holding sub-portion; 13: first arm; 14: first suction hole; 15: cavity; 16: exhaust hole; 17: first flow path; 18: second flow path; 20: pressurized gas supply portion; 22: second suction hole; 23: vacuum pump; 25: optical axis; 26: locus of center of workpiece; 27: centrifugal force; 28: closed loop; 29: driver; 30: first driver; 31: first base; 31m: base plate; 31n: hole; 31p: case; 31q: fifth motor; 31r: third ball screw; 32: first motor; 33: first ball screw; 34: first guide rail; 35: second driver; 36: second base; 37: second motor; 38: second ball screw; 39: second guide rail; 40: third base; 41: first stretchable protective cover; 42: support; 44: third driver; 45: third motor; 46: third ball screw; 47: fourth base; 48: fifth base; 49: second stretchable protective cover; 50: head; 51: mirror; 52: lens; 53: transparent window; 54, 54e: first nozzle; 60: laser source unit; 61: laser source; 62: laser beam; 63: shutter; 64: frequency regulator; 65: power meter; 66: light guide; 70: liquid reservoir; 70b: gas supply portion; 71: first pipe; 72: first pump; 73: first liquid; 73b: gas; 74: second pipe; 74b: gas pipe; 75: second pump; 76, 76h, 90: second nozzle; 76g: gas nozzle; 77: second arm; 77e: fourth arm; 78: second liquid; 79: liquid layer; 80: controller; 82: first portion; 91: third arm; 92: intersection point; 93: the same spot; 95: fourth motor; 96: gap

The invention claimed is:

1. A laser processing apparatus comprising:
 a holder configured to hold a workpiece;
 a head configured to irradiate a first portion of a main surface of the workpiece with a laser beam;
 a first nozzle configured to supply a first liquid to the first portion;
 a second nozzle configured to supply a second liquid to a second portion of the main surface different from the first portion; and
 a driver configured to drive the holder in such a manner that the workpiece can revolve around an optical axis of the laser beam at the first portion,
 wherein a second supply rate of the second liquid is higher than a first supply rate of the first liquid,
 wherein the driver is configured to rotate the workpiece around a central axis of the workpiece while the workpiece is revolving, the central axis passes through a center of the main surface and is perpendicular to the main surface, and a second angular velocity of the rotation of the workpiece is lower than a first angular velocity of the revolution of the workpiece.

2. The laser processing apparatus according to claim 1, wherein the first nozzle is provided on the head in such a manner that the laser beam can be emitted from the first nozzle and can propagate through a liquid column formed by the first liquid between the first nozzle and the first portion.

3. The laser processing apparatus according to claim 1, further comprising a plurality of second nozzles configured to supply a second liquid to a second portion of the main surface different from the first portion,
 a second supply rate of the second liquid being higher than a first supply rate of the first liquid, the plurality of second nozzles being disposed in such a manner that, while the workpiece is revolving, the second liquid can continue being supplied to the second portion.

4. The laser processing apparatus according to claim 1, wherein the driver is configured to maintain an orientation of the workpiece while the workpiece is revolving.

5. A laser processing apparatus comprising:
a holder configured to hold a workpiece in such a manner that a main surface of the workpiece is inclined relative to a horizontal plane;
a head configured to irradiate a first portion of the main surface with a laser beam;
a first nozzle configured to supply a first liquid to the first portion;
a second nozzle configured to supply a second liquid to a second portion of the main surface different from the first portion, the second nozzle having a width greater than or equal to a maximum length of the workpiece in plan view of the main surface; and
a driver configured to drive the holder in such a manner that the workpiece can rotate around a central axis of the workpiece, the central axis passing through a center of the main surface and being perpendicular to the main surface, the first portion being at a position higher than the second portion and the center;
wherein the driver is configured to rotate the workpiece around a central axis of the workpiece while the workpiece is revolving, the central axis passes through a center of the main surface and is perpendicular to the main surface, and a second angular velocity of the rotation of the workpiece is lower than a first angular velocity of the revolution of the workpiece.

6. The laser processing apparatus according to claim 5, wherein the first nozzle is provided on the head in such a manner that the laser beam can be emitted from the first nozzle and can propagate through a liquid column formed by the first liquid between the first nozzle and the first portion.

7. The laser processing apparatus according to claim 5, wherein a second supply rate of the second liquid is higher than a first supply rate of the first liquid.

8. A laser processing method comprising:
supplying a first liquid from a first nozzle to a first portion of a main surface of a workpiece;
irradiating the first portion with a laser beam while revolving the workpiece around an optical axis of the laser beam at the first portion; and
supplying a second liquid from a second nozzle to a second portion of the main surface different from the first portion before irradiating the first portion with the laser beam,
wherein a second supply rate of the second liquid is higher than a first supply rate of the first liquid;
wherein the workpiece is rotating around a central axis of the workpiece while the workpiece is revolving, the central axis passes through a center of the main surface and is perpendicular to the main surface, and a second angular velocity of the rotation of the workpiece is lower than a first angular velocity of the revolution of the workpiece.

9. The laser processing method according to claim 8, wherein the laser beam is emitted from the first nozzle and propagates through a liquid column formed by the first liquid between the first nozzle and the first portion.

10. The laser processing method according to claim 8, wherein the first liquid continues being supplied to the first portion from the time before the first portion is irradiated with the laser beam.

11. The laser processing method according to claim 8, further comprising supplying a second liquid from a plurality of second nozzles to a second portion of the main surface different from the first portion before irradiating the first portion with the laser beam,
a second supply rate of the second liquid being higher than a first supply rate of the first liquid, the plurality of second nozzles being disposed in such a manner that, while the workpiece is revolving, the second liquid can continue being supplied to the second portion.

12. The laser processing method according to claim 8, wherein an orientation of the workpiece is maintained while the workpiece is revolving.

13. A method for manufacturing a semiconductor apparatus, the method comprising:
separating a workpiece into an inner circumferential region of the workpiece and an outer circumferential region of the workpiece using a laser processing apparatus; and
forming a plurality of semiconductor devices in the inner circumferential region of the workpiece,
the laser processing apparatus comprising:
a holder configured to hold a workpiece;
a head configured to irradiate a first portion of a main surface of the workpiece with a laser beam:
a first nozzle configured to supply a first liquid to the first portion;
a second nozzle configured to supply a second liquid to a second portion of the main surface different from the first portion; and
a driver configured to drive the holder in such a manner that the workpiece can revolve around an optical axis of the laser beam at the first portion, and
wherein a second supply rate of the second liquid is higher than a first supply rate of the first liquid;
wherein the driver is configured to rotate the workpiece around a central axis of the workpiece while the workpiece is revolving, the central axis passes through a center of the main surface and is perpendicular to the main surface, and a second angular velocity of the rotation of the workpiece is lower than a first angular velocity of the revolution of the workpiece.

14. A method for manufacturing a semiconductor apparatus, the method comprising:
separating a workpiece into an inner circumferential region of the workpiece and an outer circumferential region of the workpiece by a laser processing method; and
forming a plurality of semiconductor devices in the inner circumferential region of the workpiece,
the laser processing method comprising:
supplying a first liquid from a first nozzle to a first portion of a main surface of the workpiece;
irradiating the first portion with a laser beam while revolving the workpiece around an optical axis of the laser beam at the first portion; and
supplying a second liquid from a second nozzle to a second portion of the main surface different from the first portion before irradiating the first portion with the laser beam,
wherein a second supply rate of the second liquid is higher than a first supply rate of the first liquid;
wherein the workpiece is rotating around a central axis of the workpiece while the workpiece is revolving, the central axis passes through a center of the main surface and is perpendicular to the main surface, and a second angular velocity of the rotation of the workpiece is lower than a first angular velocity of the revolution of the workpiece.

* * * * *